US009815477B2

(12) United States Patent
Yu et al.

(10) Patent No.: US 9,815,477 B2
(45) Date of Patent: Nov. 14, 2017

(54) SYSTEM AND METHOD FOR FLEET MANAGEMENT FOR WORK VEHICLES

(71) Applicant: Deere & Company, Moline, IL (US)

(72) Inventors: Wentao Yu, Dubuque, IA (US); Bryan D. Sulzer, Dubuque, IA (US)

(73) Assignee: Deere & Company, Moline, IL (US)

( * ) Notice: Subject to any disclaimer, the term of this patent is extended or adjusted under 35 U.S.C. 154(b) by 12 days.

(21) Appl. No.: 15/046,766

(22) Filed: Feb. 18, 2016

(65) Prior Publication Data

US 2017/0240181 A1 Aug. 24, 2017

(51) Int. Cl.
| | |
|---|---|
| B60W 40/00 | (2006.01) |
| B60W 40/08 | (2012.01) |
| B60R 25/00 | (2013.01) |
| G06Q 10/06 | (2012.01) |

(52) U.S. Cl.
CPC ............ B60W 40/08 (2013.01); B60R 25/00 (2013.01); G06Q 10/063112 (2013.01); *B60W 2040/0809* (2013.01)

(58) Field of Classification Search
CPC .......... B60W 40/08; B60W 2040/0809; B60R 25/00; G06Q 10/063112
See application file for complete search history.

(56) References Cited

U.S. PATENT DOCUMENTS

| | | | | |
|---|---|---|---|---|
| 5,821,631 | A * | 10/1998 | Loraas | ..................... B60R 25/04 |
| | | | | 123/198 B |
| 6,611,755 | B1 * | 8/2003 | Coffee | ..................... B28C 5/422 |
| | | | | 340/438 |
| 7,181,409 | B1 | 2/2007 | Murakami et al. | |
| 2003/0034873 | A1 | 2/2003 | Chase et al. | |
| 2005/0134115 | A1 * | 6/2005 | Betts | ..................... B60R 25/04 |
| | | | | 307/10.1 |
| 2007/0001826 | A1 * | 1/2007 | Lanier | ..................... B60R 25/04 |
| | | | | 340/425.5 |
| 2008/0121690 | A1 * | 5/2008 | Carani | .................. G01S 5/0027 |
| | | | | 235/376 |
| 2008/0150679 | A1 * | 6/2008 | Bloomfield | ............. B60R 25/24 |
| | | | | 340/5.7 |
| 2010/0179709 | A1 * | 7/2010 | Abshire | .................. B60R 25/00 |
| | | | | 701/2 |
| 2010/0321173 | A1 * | 12/2010 | Magner | .............. G07C 9/00182 |
| | | | | 340/426.1 |

(Continued)

*Primary Examiner* — Behrang Badii
*Assistant Examiner* — Daniel L Greene
(74) *Attorney, Agent, or Firm* — Lorenz & Kopf, LLP

(57) ABSTRACT

A fleet management control system and method are disclosed for a plurality of work vehicles each having a respective work tool. The work vehicles are associated with an owner and a plurality of operators. The fleet management system includes a source of input data that provides operator identification data for the work vehicles and operator permissions data that indicates at least which of the work vehicles each of the operators is permitted to operate. The fleet management system includes a remote processing system having a processor that receives and processes the operator identification and operator permissions data, outputs fleet management data that includes a fleet operator profile for the work vehicles based on the operator identification and operator permissions data, and communicates the fleet management data to a controller of each of the work vehicles.

19 Claims, 11 Drawing Sheets

(56) References Cited

U.S. PATENT DOCUMENTS

| | | | |
|---|---|---|---|
| 2011/0018684 A1* | 1/2011 | Wang | G07C 9/00309 |
| | | | 340/5.62 |
| 2014/0031010 A1* | 1/2014 | Wuergler | H04W 4/046 |
| | | | 455/411 |
| 2014/0338409 A1* | 11/2014 | Kraus | E05B 85/16 |
| | | | 70/278.1 |
| 2015/0039269 A1* | 2/2015 | Mejegard | G06Q 10/06 |
| | | | 702/182 |
| 2015/0348346 A1 | 12/2015 | Morselli | |
| 2016/0059825 A1* | 3/2016 | Coombs | B60R 25/23 |
| | | | 701/45 |

* cited by examiner

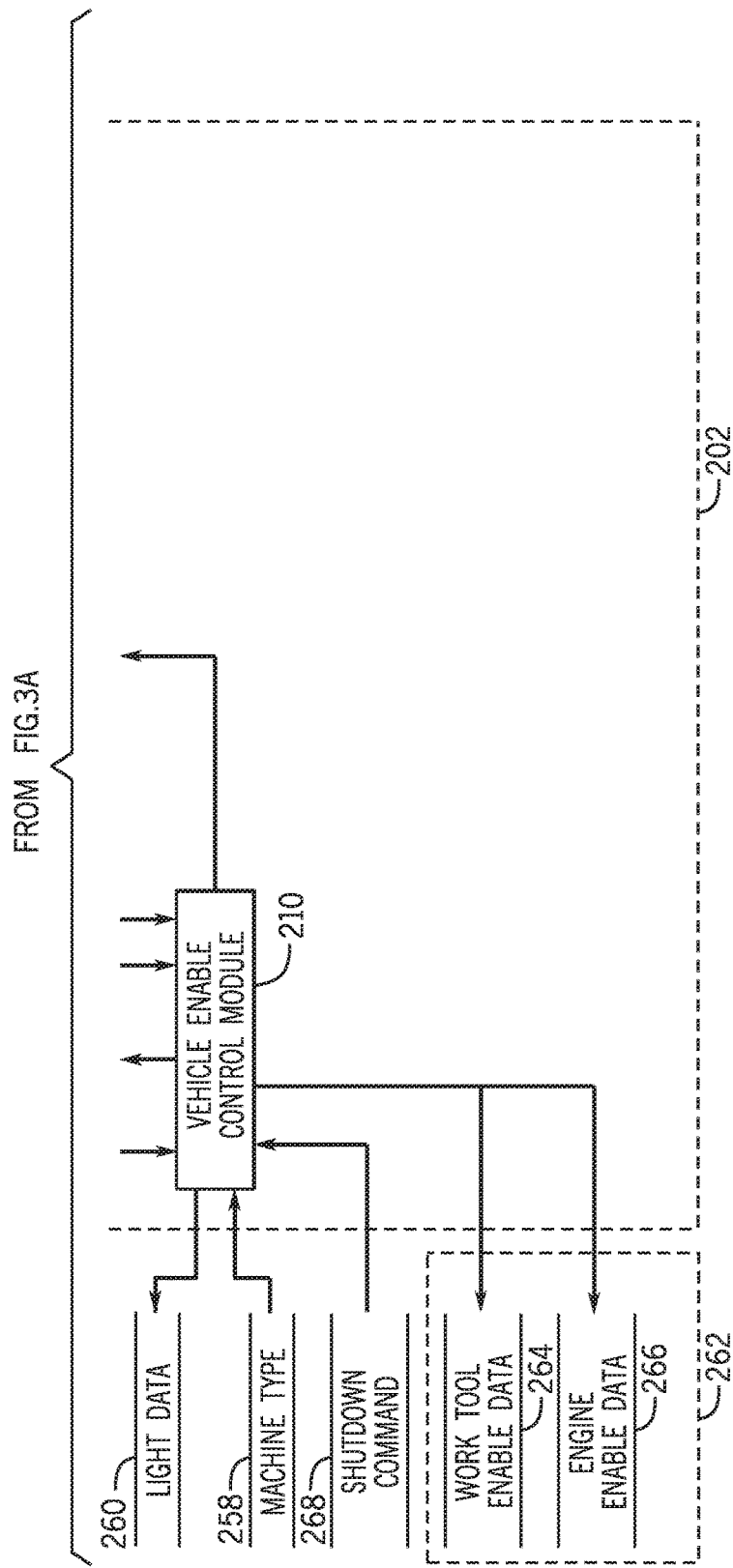

SYSTEM AND METHOD FOR FLEET MANAGEMENT FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to fleet management for work vehicles, including an identification of an operator associated with a respective fleet.

BACKGROUND OF THE DISCLOSURE

In the construction industry, various work vehicles are operated to perform various tasks at a work site. For example, an articulated dump truck may be utilized to haul loads of material over rough terrain. Given the nature of the work site, many work vehicles, including the articulated dump truck, do not utilize a key based ignition system.

In certain examples, each work vehicle at the work site has a unique access code. This requires an operator to remember and enter each unique access code at each work vehicle in order to operate the work vehicle. By requiring multiple access codes, operators may become frustrated when operating various work vehicles at the work site.

SUMMARY OF THE DISCLOSURE

The disclosure provides a system and method for fleet management of work vehicles.

In one aspect the disclosure provides a fleet management system for a plurality of work vehicles each having a respective work tool. The work vehicles are associated with an owner and a plurality of operators. The fleet management system includes a source of input data that provides operator identification data for the work vehicles and operator permissions data that indicates at least which of the work vehicles each of the operators is permitted to operate. The fleet management system includes a remote processing system having a processor that receives and processes the operator identification and operator permissions data, outputs fleet management data that includes a fleet operator profile for the work vehicles based on the operator identification and operator permissions data, and communicates the fleet management data to a controller of each of the work vehicles.

In another aspect the disclosure provides a fleet management method for a plurality of work vehicles each having a respective work tool. The fleet of work vehicles are associated with an owner and a plurality of operators. The fleet management method includes: receiving, from a source of input, an operator profile one for each of the plurality of operators; generating a fleet operator profile based on the received operator profile; receiving, from a source of input data at an associated of the work vehicles, identification data that identifies an operator of the operators; determining, with a controller of the associated work vehicle, whether the identification data corresponds with the fleet user profile; and at least one of: outputting one or more control signals with the controller of the associated work vehicle to enable a start-up of an engine of the associated work vehicle based on the determination, and outputting one or more control signals with the controller of the associated work vehicle to enable a movement of the work tool of the associated work vehicle based on the determination.

In yet another aspect the disclosure provides a fleet management system for a plurality of work vehicles each having a respective work tool. The work vehicles are associated with an owner and a plurality of operators. The fleet management system includes a source of input data remote from the work vehicles that provides an operator profile for each of the operators. The operator profile includes operator identification data for the work vehicles and operator permissions data that indicates at least which of the work vehicles each of the operators is permitted to operate. The fleet management system includes a source of operator requirements for each of the work vehicles. The fleet management system also includes a remote processing system having a processor that receives and processes the operator profile, outputs fleet management data that includes a fleet user profile for the work vehicles based on the operator profile for the operators, and communicates the fleet management data to a controller of each of the work vehicles. The fleet management system includes the controller of an associated one of the work vehicles that processes the fleet management data, and the controller: receives a source of identification data that identifies an operator at the associated work vehicle; determines whether the identification data matches the operator identification data associated with the fleet user profile; determines whether the operator is permitted to operate the associated work vehicle based on at least one of the operator permissions and the source of operator requirements for the work vehicle; and enables a motion of the associated work vehicle or the associated work tool based on the determinations.

The details of one or more embodiments are set forth in the accompanying drawings and the description below. Other features and advantages will become apparent from the description, the drawings, and the claims.

BRIEF DESCRIPTION OF THE DRAWINGS

FIG. 3B is a continuation of the dataflow diagram of FIG. 3A;

Like reference symbols in the various drawings indicate like elements.

DETAILED DESCRIPTION

Figure 1:
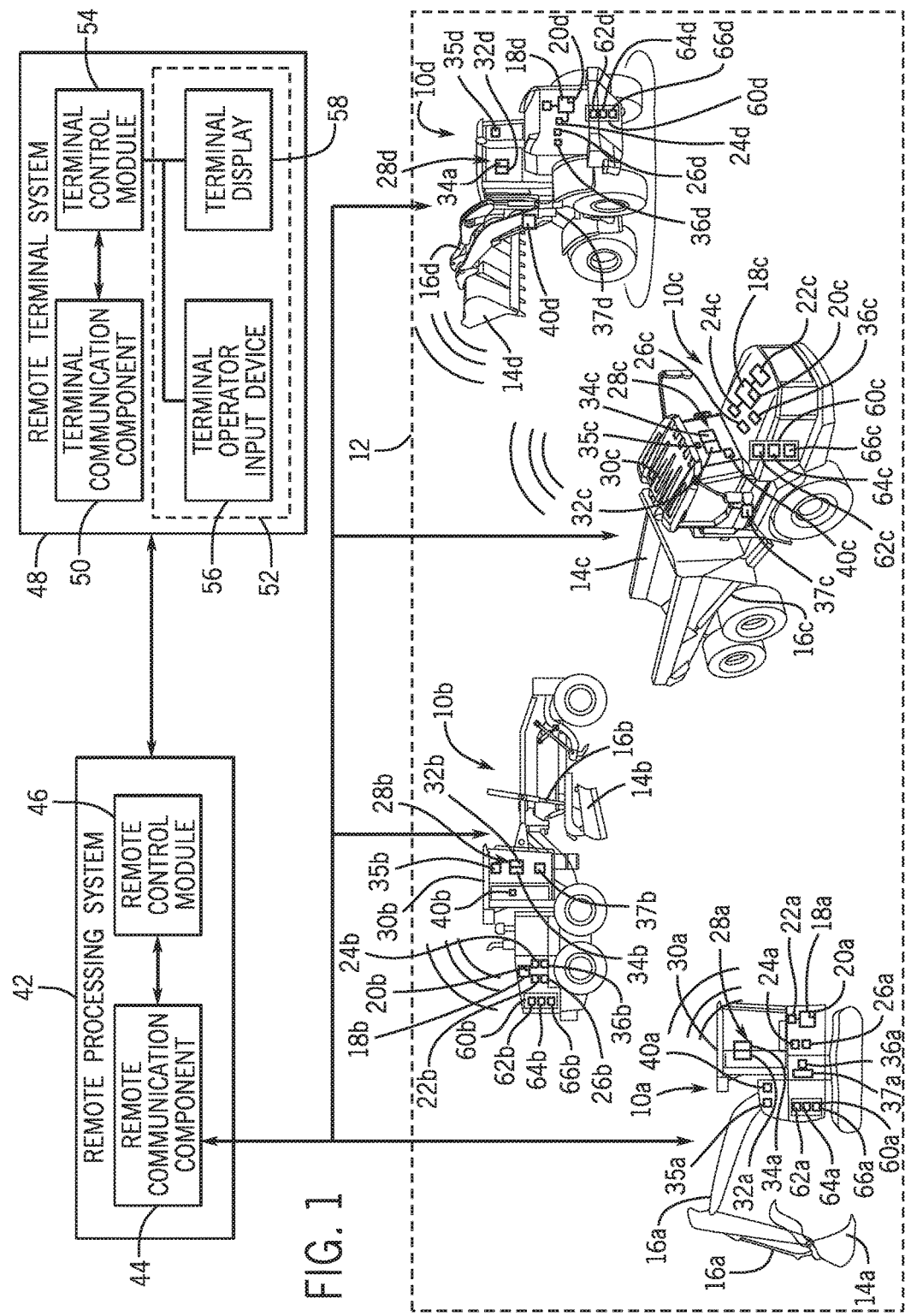
FIG. 1 is a perspective view of the disclosed fleet management system for managing a fleet of work vehicles, with the exemplary fleet of work vehicles including an excavator, a grader, an articulated dump truck and a loader in accordance with various embodiments.

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles, and that the work vehicles described herein are merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system for fleet management that includes controlling the operation of a plurality of work vehicles and the work tool associated with each of the plurality of work vehicles based on fleet management data received from a remote processing system, such as a telematics system, as shown in the accompanying figures of the drawings described briefly above. Generally, the disclosed control systems (and plurality of work vehicles in which they are implemented) provide for improved management of the plurality of work vehicles as compared to conventional systems by providing operator profiles associated with a plurality of operators of the fleet of work vehicles to a controller of each of the plurality work vehicles within the fleet of work vehicles such that an operator associated with the fleet of work vehicles can access and operate multiple work vehicles within the fleet of work vehicles with a single operator identifier (e.g. operator ID and password), which is part of the operator profile. Based on this single operator identifier, the controller of each work vehicle in the fleet of work vehicles can verify the operator as being associated with the fleet operator profile received in the fleet management data, and enables a motion of the respective work vehicle, such as an enable a start-up of an engine, and enables an operation of the work tool. By requiring a single operator identifier for each of the work vehicles within the fleet of work vehicles, operators associated with the fleet of work vehicles are not required to remember unique access codes for each individual work vehicle. Moreover, one or more preferences of the operator for one or more vehicle systems of the work vehicle can be associated with the operator's operator profile, enabling the one or more preferences to be applied upon each verification of the operator, for each work vehicle within the fleet of work vehicles.

Generally, the disclosed fleet management control system includes the remote processing system that is in communication with one or more terminal processing devices, such as a portable electronic device, that is remote from the work vehicle. The terminal processing device is in communication with the remote processing system to provide operator profile data, such as an operator identification, operator permissions and operator capabilities, for each of the operators associated with the fleet of work vehicles. Generally, the operator profile data is provided by an owner of the fleet of work vehicles, upon verification that an owner identifier (e.g. owner ID and password) matches a registered owner in a datastore associated with the remote processing system. Upon verification of the owner, the owner can input the operator profile data (e.g. operator identification data, operator permissions data and operator capability data) associated with the owner's fleet of work vehicles (i.e. fleet operator profile), remove operator profiles from the fleet operator profile and add new operator profiles to the fleet operator profile. Each of these processes can be completed through a respective user interface output for display on a display of the terminal processing device. The verified owner can also input a fleet personal identification number (PIN), which can include a machine access personal identification number (PIN) and a service personal identification number (PIN) that enables entry into a cab of each work vehicle in the fleet of work vehicles. It should be noted that as used herein personal identification number or PIN comprises any numeric character, alpha-numeric character, punctuation character, symbol or combination thereof that defines a unique access code or service access code to gain entry into the owner's fleet of work vehicles.

The remote processing system associates the fleet operator profile, the fleet PIN (the fleet access PIN and the fleet service PIN) with the fleet of work vehicles of the owner and communicates this data as the fleet management data to each of the controllers of the work vehicles in the owner's fleet of work vehicles. Based on the receipt of the fleet management data, the controllers of the work vehicles store the fleet operator profile and the fleet PIN in a local datastore on the work vehicle. Upon receipt of personal identification number (PIN) input data from a keyless entry system, for example, associated with or at the work vehicle, the controller of the respective work vehicle queries the local datastore to determine whether the PIN input data matches one of the fleet PINs. Based on the PIN input data matching the fleet access PIN, the controller of the respective work vehicle outputs one or more control signals to a light source to illuminate the cab of the work vehicle, and also outputs a user or operator interface for display on a human-machine interface of the work vehicle, which enables the operator to enter identification data at the work vehicle that identifies the operator.

Upon receipt of identification data, the controller of the work vehicle queries the local datastore to determine if the identification data matches one of the operator identification data or operator profiles associated with the fleet operator profile. Based on a match, the controller of the work vehicle retrieves the operator profile and determines whether the operator is permitted to operate the work vehicle based on the operator permissions data and the operator requirements for the work vehicle. In this regard, one or more of the work vehicles may require operators to undergo licensing or qualification training prior to being permitted to operate the work vehicle. In other examples, the operator may be permitted to operate a particular work vehicle within the fleet of work vehicles, the operator may be permitted to operate the particular work vehicle for a certain period of time, or may be required to rotate amongst the work vehicle, such that the operator may only be permitted to operate this particular work vehicle if the operator has previously operated a different type of work vehicle. If the controller of the work vehicle determines that the operator is not permitted to operate the work vehicle, the controller outputs an error notification for display on the display of the work vehicle. Otherwise, the controller outputs one or more control signals to enable a motion of the work vehicle and/or to enable a movement of the work tool of the work vehicle. The controller also outputs one or more control signals based on the preferences identified in the retrieved operator profile.

As noted above, the disclosed fleet management control system and method may be utilized with regard to various work vehicles, including articulated dump trucks, loaders, graders, tractors, combines, excavators, etc. Referring to FIG. 1, in some embodiments, the disclosed fleet management control system can be used with work vehicles 10, such as an excavator 10a, a grader 10b, an articulated dump truck (ADT) 10c and a loader 10d. The excavator 10a, grader 10b, ADT 10c and loader 10d together comprise a fleet of work vehicles 12. It should be understood that one or more work vehicles 10 can comprise the fleet of work vehicles 12, and that the fleet of work vehicles 12 need not be limited to the types of work vehicles 10a-d illustrated herein, but rather, the fleet of work vehicles 12 can comprise any number of the same or different work vehicles 10. For example, work vehicles in some embodiments may be configured as haulers or loaders, such as tractor loaders, crawler loaders or similar machines. Further, work vehicles may be configured as machines other than construction vehicles, including machines from the agriculture, forestry and mining industries, such as tractors, combines, harvesters, feller bunchers, and so on. Thus, the configuration of the fleet management control system for use with the excavator 10a, grader 10b, ADT 10c and loader 10d is merely an example. The fleet management control system associates one or more operators with the fleet of work vehicles 10. In this example, each of the work vehicles 10a-d in the fleet of vehicles 12 includes a work tool 14, such as a scoop 14a, a blade 14b, a load bin 14c and a bucket 14d, respectively. It will be understood that the configuration of the work vehicle 10 having the exemplary work tool 14a-d is presented as an example only.

Generally, each of the work tools 14 is operable by one or more hydraulic cylinders 16 to perform an action. For example, one or more hydraulic cylinders 16a are driven or actuated in order to move the scoop 14a. One or more hydraulic cylinders 16b are driven or actuated in order to adjust a level of the blade 14b. One or more hydraulic actuators 16c are driven or actuated to pivot the load bin 14c. One or more hydraulic cylinders 16d are driven or actuated to raise or lower the bucket 14d.

Each of the work vehicles 10a-d also includes a source of propulsion, such as an engine 18a-d. The respective engine 18a-d supplies power to a transmission (not shown). In one example, the engines 18a-d are each an internal combustion engine, such as a diesel engine, which is controlled by a respective engine control module 20a-d. As will be discussed further herein, the engine control module 20a-d receives one or more control signals or control commands from a respective controller 22a-d to enable motion of the respective work vehicle 10a-d by enabling a start-up of the respective engine 18a-d. The engine control module 20a-d also receives one or more control signals or control commands from the respective controller 22a-d to enable a shutdown of the respective engine 18a-d. It should be noted that the use of an internal combustion engine is merely an example, as the propulsion device can be a fuel cell, an electric motor, a hybrid-gas electric motor, etc., which is responsive to one or more control signals from the controller 22a-d to enable a start-up or a shutdown of the propulsion device. The transmission (not shown) transfers the power from the engine 18a-d to a suitable driveline coupled to one or more driven wheels or tracts of the respective work vehicle 10a-d to enable the work vehicle 10a-d to move.

Each work vehicle 10a-d also includes one or more pumps 24a-d, which may be driven by the engine 18a-d of the work vehicle 10a-d. Flow from the pumps 24a-d may be routed through various control valves 26a-d and various conduits (e.g., flexible hoses) in order to drive the hydraulic cylinders 16a-d. Flow from the pumps 24a-d may also power various other components of the work vehicle 10a-d. The flow from the pumps 24a-d can be controlled in various ways (e.g., through control of the various control valves 26a-d), in order to cause movement of the hydraulic cylinders 16a-d, and thus, movement of the work tool 14a-d. In this way, for example, a movement of the respective work tool 14a-d can be implemented by various control signals to a hydraulic circuit including the pumps 24a-d, control valves 26a-d, and so on.

Generally, each of the controllers 22a-d (or multiple controllers associated with each work vehicle 10a-d) may be provided, for control of various aspects of the operation of each of the work vehicles 10a-d, in general. The controllers 22a-d (or others) may be configured as a computing device with associated processor devices and memory architectures, as a hard-wired computing circuit (or circuits), as a programmable circuit, as a hydraulic, electrical or electro-hydraulic controller, or otherwise. As such, the controllers 22a-d may be configured to execute various computational and control functionality with respect to the work vehicle 10a-d (or other machinery). In some embodiments, the controller 22a-d may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 22a-d (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 22a-d can be in electronic, hydraulic, mechanical, or other communication with various other systems or devices of the respective work vehicle 10a-d (or other machinery). For example, the controller 22a-d may be in electronic or hydraulic communication with various actuators, sensors, and other devices within (or outside of) the respective work vehicle 10a-d, including various devices associated with the pumps 24a-d, control valves 26a-d, and so on. The controller 22a-d may communicate with other systems or devices (including other controllers) in various known ways, including via a CAN bus (not shown) of the respective work vehicle 10a-d, via wireless or hydraulic communication means, or otherwise. An example location for the controller 22a-d is depicted in FIG. 1. It will be understood, however, that other locations are possible including other locations on the work vehicle 10a-d, or various remote locations.

In some embodiments, the controller 22a-d can be configured to receive input commands and to interface with an operator via a respective human-machine interface 28a-d, which may be disposed inside a cab 30a-d of the respective work vehicle 10a-d for easy access by the operator. The human-machine interface 28a-d can be configured in a variety of ways. In some embodiments, the human-machine interface 28a-d includes an input device 32a-d comprising one or more joysticks, various switches or levers, one or more buttons, a touchscreen interface that may be overlaid on a display 34a-d, a keyboard, a speaker, a microphone associated with a speech recognition system, or various other human-machine interface devices. The human-machine interface 28a-d also includes the display 34a-d, which can be implemented as a flat panel display or other display type that is integrated with an instrument panel or console of the work vehicle 10a-d. Those skilled in the art may realize other techniques to implement the display 34a-d in each of the work vehicles 10a-d. The display 34a-d comprises any suitable technology for displaying information, including, but not limited to, a liquid crystal display (LCD), organic light emitting diode (OLED), plasma, or a cathode ray tube (CRT).

The cabs 30a-d can also include a light source 35a-d and a keyless entry system 37a-d. The light source 35a-d can comprise any light emitting device, such as a light bulb, light emitting diode (LED) array, and so on, which illuminates the respective cab 30a-d. The light source 35a-d is responsive to one or more control signals from the respective controller 22a-d to illuminate the respective cab 30a-d. The keyless entry system 37a-d can be a keypad or other keyless access device, which is in communication with each of the respective controllers 22a-d. In the example of a keypad, the keyless entry system 37a-d comprises a plurality of operator input devices, such as buttons, which are manipulable by an operator to enter a code or personal identification number (PIN). In the example of a keypad as the keyless entry system 37a-d, the keypad comprises any combination of numeric characters, alpha-numeric characters, punctuation characters or symbols that can be manipulated by an operator to input a unique access code or access personal identification number; and a unique service access code or service personal identification number to gain entry into the respective work vehicle 10a-d.

The input received by the plurality of operator input devices is communicated to the controller 22a-d, which determines whether to allow access to the respective work vehicle 10a-d. Based on the determination, the controller 22a-d outputs one or more control signals to unlock a lock actuator associated with a door of the cab 30a-d to enable access into the cab 30a-d.

Various sensors may also be provided to observe various conditions associated with the work vehicle 10a-d. In some embodiments, various sensors 36a-d (e.g., pressure, flow or other sensors) may be disposed near the pumps 24a-d and control valves 26a-d, or elsewhere on the work vehicle 10a-d. For example, sensors 36a-d may include one or more pressure sensors that observe a pressure within the hydraulic circuit, such as a pressure associated with at least one of the one or more hydraulic cylinders 16a-d. The sensors 36a-d may also observe a pressure associated with the pumps 24a-d. In some embodiments, various sensors may be disposed near the work tool 14a-d.

The various components noted above (or others) may be utilized to control movement of the work tool 14a-d via control of the movement of the one or more hydraulic cylinders 16a-d. The sensors 36a-d may be in communication with the respective controller 22a-d via a suitable communication architecture, such as the CAN bus associated with the work vehicle 10a-d. The work vehicle 10a-d may also include a clock, which provides a time of day and a date in order to inform the fleet management control system and method described herein. It should be noted that the time of day and the date may also be received from a global positioning system (GPS; not shown) associated with the work vehicle 10a-d.

Each of the work vehicles 10a-d also includes a respective vehicle communication component 40a-d. The vehicle communication component 40a-d enables communication between the controller 22a-d and a remote processing system 42. The vehicle communication component 40a-d comprises any suitable system for receiving data from and transmitting data to the remote processing system 42. For example, the vehicle communication component 40a-d may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The vehicle communication component 40a-d also transmits data to the remote station (not shown) to achieve bi-directional communications. However, other techniques for transmitting and receiving data may alternately be utilized. In one example, the vehicle communication component 40a-d achieves bi-directional communications with the remote processing system 42 over Bluetooth®, satellite or by utilizing a Wi-Fi standard, i.e., one or more of the 802.11 standards as defined by the Institute of Electrical and Electronics Engineers ("IEEE"), as is well known to those skilled in the art. Thus, the vehicle communication component 40a-d comprises a Bluetooth® transceiver, a satellite transceiver, a radio transceiver, a cellular transceiver, an LTE transceiver and/or a Wi-Fi transceiver.

In certain embodiments, the vehicle communication component 40a-d may be configured to encode data or generate encoded data. The encoded data generated by the vehicle communication component 40a-d may be encrypted. A security key may be utilized to decrypt and decode the encoded data, as is appreciated by those skilled in the art. The security key may be a "password" or other arrangement of data that permits the encoded data to be decrypted. Alternatively, the remote station (not shown) may implement security protocols to ensure that communication takes place between the appropriate work vehicle 10a-d and the remote processing system 42.

The remote processing system 42 is in communication with the fleet of work vehicles 12 to provide fleet management data to each of the work vehicles a-d, as will be discussed herein. In one example, the remote processing system 42 comprises a telematics system. The remote processing system 42 includes a remote communication component 44 and a remote control module 46. The remote control module 46 can be a remote server, or other remote computing device. The remote communication component 44 comprises any suitable system for receiving data from and transmitting data to the vehicle communication component 40a-d. For example, the remote communication component 44 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The remote communication component 44 also transmits data to the remote station (not shown) to achieve bi-directional communications. However, other techniques for transmitting and receiving data may alternately be utilized. For example, the remote communication component 44 may achieve bi-directional communications with the vehicle communication component 40a-d over Bluetooth®, satellite, or by utilizing a Wi-Fi standard, i.e., one or more of the 802.11 standards as defined by the Institute of Electrical and Electronics Engineers ("IEEE"), as is known to those skilled in the art. Thus, the remote communication component 44 comprises a Bluetooth® transceiver, a radio transceiver, a cellular transceiver, a satellite transceiver, an LTE transceiver and/or a Wi-Fi transceiver.

The remote communication component 44 may also be configured to encode data or generate encoded data. The encoded data generated by the remote communication component 44 may be encrypted. A security key may be utilized to decrypt and decode the encoded data, as is appreciated by those skilled in the art. The security key may be a "password" or other arrangement of data that permits the encoded data to be decrypted.

The remote control module 46 is in communication with the remote communication component 44 over a suitable interconnection architecture or arrangement that facilitates transfer of data, commands, power, etc. The remote control module 46 may also be in communication with one or more remote operators via a remote terminal system 48. The remote control module 46 enables two way data transfer with the work vehicles 10a-d via the remote communication component 44, and also enables two-way data transfer with the remote terminal system 48.

The remote terminal system 48 is in communication with the remote processing system 42 to transmit data for the management of the fleet of work vehicles 12 and to receive the data from the remote processing system 42. In certain examples, the remote terminal system 48 includes a terminal communication component 50, a terminal operator interface 52 and a terminal control module 54. The terminal communication component 50 comprises any suitable system for receiving data from and transmitting data to the remote processing system 42. For example, the terminal communication component 50 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The terminal communication component 50 also transmits data to the remote station (not shown) to achieve bi-directional communications. However, other techniques for transmitting and receiving data may alternately be utilized. For example, the terminal communication component 50 may achieve bi-directional communications with the remote communication component 44 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the terminal communication component 50 comprises a Bluetooth® transceiver, a radio transceiver, a cellular transceiver, an LTE transceiver and/or a Wi-Fi transceiver. In certain examples, the remote terminal system 48 comprises a personal computing device, such as a computer, tablet, cellular smart phone, and so on, which is in communication with the remote processing system 42 over a wired or wireless Internet connection, via a web-based portal, for example.

The terminal communication component 50 may also be configured to encode data or generate encoded data. The encoded data generated by the terminal communication component 50 may be encrypted. A security key may be utilized to decrypt and decode the encoded data, as is appreciated by those skilled in the art. The security key may be a "password" or other arrangement of data that permits the encoded data to be decrypted.

The terminal operator interface 52 allows the operator of the remote terminal system 48 to interface with the remote processing system 42 (e.g. to input commands and data). In one example, the terminal operator interface 52 includes a terminal input device 56 and a terminal display 58. The terminal input device 56 is any suitable device capable of receiving operator input, including, but not limited to, a keyboard, a microphone, a touchscreen layer associated with the terminal display 58, or other suitable device to receive data and/or commands from the operator. Of course, multiple input devices 56 can also be utilized. The terminal display 58 comprises any suitable technology for displaying information, including, but not limited to, a liquid crystal display (LCD), organic light emitting diode (OLED), plasma, or a cathode ray tube (CRT).

The terminal control module 54 is in communication with the terminal communication component 50 and the terminal operator interface 52 over a suitable interconnection architecture or arrangement that facilitates transfer of data, commands, power, etc. The terminal control module 54 can be configured as a computing device with associated processor devices and memory architectures, as a hard-wired computing circuit (or circuits), as a programmable circuit, or otherwise. The terminal control module 54 receives input from the terminal operator interface 52 and sets data for transmission by the terminal communication component 50 to the remote processing system 42. The terminal control module 54 can also receive data from the remote communication component 44 and set this data as output for display on the terminal display 58 of the terminal operator interface 52. Thus, the terminal control module 54 enables two-way data transfer with the remote processing system 42.

In various embodiments, the remote control module 46 of the remote processing system 42 outputs one or more operator interfaces for display on the terminal operator interface 52 based on the fleet management control system and method of the present disclosure. The remote control module 46 of the remote processing system 42 outputs fleet management data to the fleet of work vehicles 12 based on input received from the terminal operator interface 52, and further based on the fleet management control system and method of the present disclosure. As will be discussed, the fleet profile data comprises one or more operator profiles associated with operators for each work vehicle 10*a*-*d* of the fleet of work vehicles 12, a machine access code or machine access PIN for each work vehicle 10*a*-*d* of the fleet of work vehicles 12 and a service access code or service access PIN for each work vehicle 10*a*-*d* of the fleet of work vehicles 12.

In various embodiments, the controllers 22*a*-*d* of the work vehicles 10*a*-*d* output one or more control signals or control commands to the engine control module 20*a*-*d* to enable a start-up of the engine 18*a*-*d* based on communications received from remote processing system 42, input received from the human-machine interface 28*a*-*d*, the keyless entry system 37*a*-*d* and further based on the fleet management control system and method of the present disclosure. The controllers 22*a*-*d* of the work vehicles 10*a*-*d* output one or more control signals or control commands to the pumps 24*a*-*d* and/or control valves 26*a*-*d* to enable the hydraulic cylinders 16*a*-*d* to be driven to enable an operation of the work tool 14*a*-*d* based on based on communications received from remote processing system 42, input received from the human-machine interface 28*a*-*d*, the keyless entry system 37*a*-*d* and further based on the fleet management control system and method of the present disclosure. The controllers 22*a*-*d* also output one or more commands to the vehicle communication component 40*a*-*d* to transmit operator preference data regarding the operator of the respective work vehicle 10*a*-*d* to the remote processing system 42 based on input received from the human-machine interface 28*a*-*d*, and further based on the fleet management control system and method of the present disclosure. The controllers 22*a*-*d* also output one or more operator interfaces for display on the respective display 34*a*-*d* based on input received from the human-machine interface 28*a*-*d*, input received from the keyless entry system 37*a*-*d*, input received from the remote processing system 42 and further based on the fleet management control system and method of the present disclosure. In certain examples, the controllers 22*a*-*d* output preference data to one or more of the pumps 24*a*-*d* of the work vehicle 10*a*-*d* based on input received from the human-machine interface 28*a*-*d*, input received from the remote processing system 42 and further based on the fleet management control system and method of the present disclosure. The controllers 22*a*-*d* also output preference data to one or more vehicle systems 60*a*-*d* of the work vehicle 10*a*-*d* based on input received from the human-machine interface 28*a*-*d*, input received from the remote processing system 42 and further based on the fleet management control system and method of the present disclosure.

In this regard, in certain examples, the controllers 22*a*-*d* are in communication with one or more vehicle systems 60*a*-*d*, to provide one or more control signals to the respective vehicle system 60*a*-*d* based on a preference of an operator associated with the fleet of work vehicles 12. For example, the controllers 22*a*-*d* are in communication with an entertainment system 62*a*-*d*, a warning system 64*a*-*d*, a seating system 66*a*-*d*, and so on. In this example, the controllers 22*a*-*d* output one or more control signals to the entertainment system 62*a*-*d* to control an output of a radio of the entertainment system 62*a*-*d* based on a preference received from the human-machine interface 28*a*-*d* or the remote processing system 42. The controllers 22*a*-*d* output one or more control signals to a warning system 64*a*-*d*, to control a number of travel beeps associated with a rearward movement of the work vehicle 10*a*-*d*, based on a preference received from the human-machine interface 28*a*-*d* or the remote processing system 42. The controllers 22*a*-*d* output one or more control signals to one or more actuators associated with the seating system 66*a*-*d* to adjust a position of a seat back or seat bottom based on a preference received from the human-machine interface 28*a*-*d* or the remote processing system 42.

Figure 2:
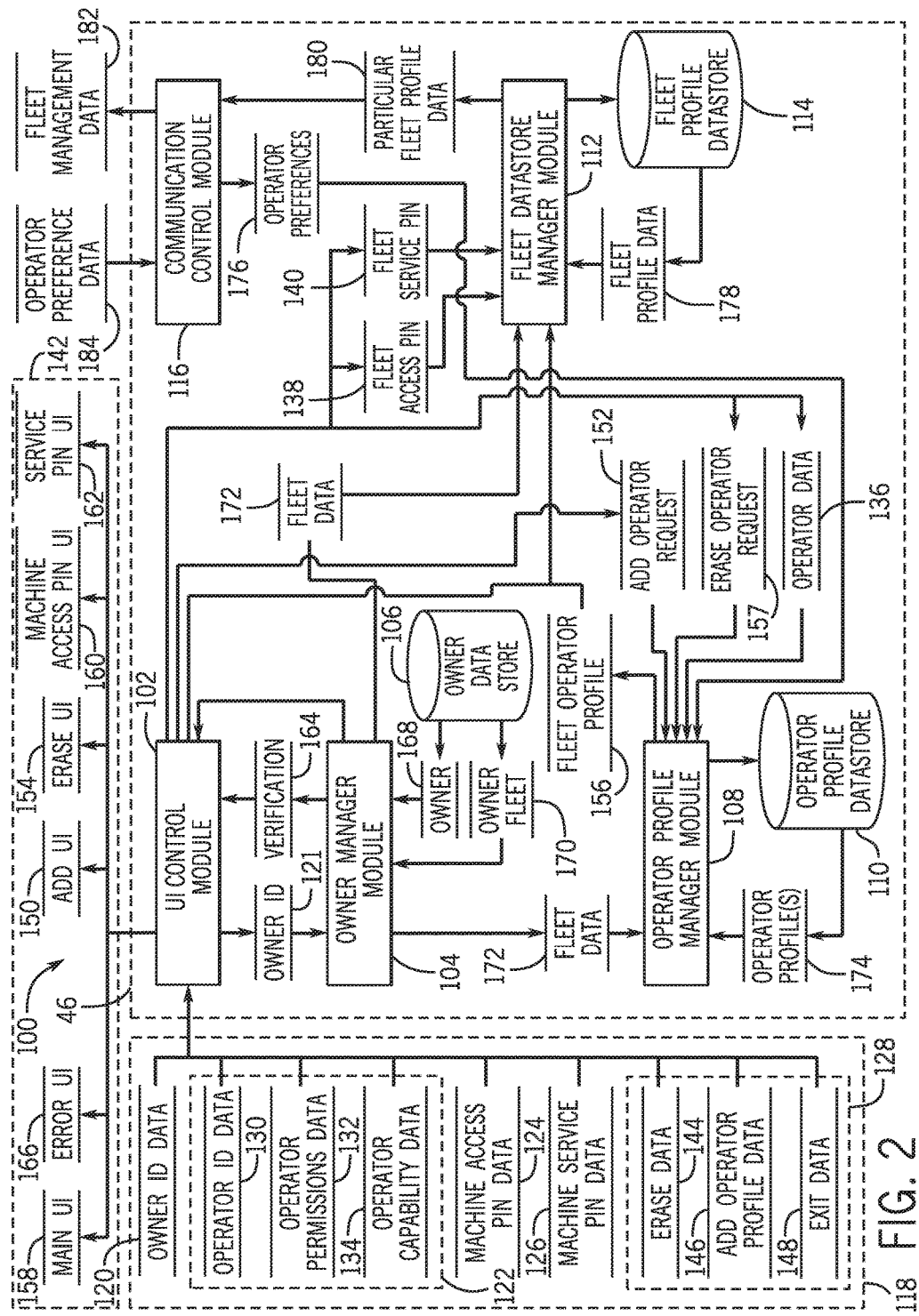
FIG. 2 is a dataflow diagram illustrating an fleet control system for the fleet of work vehicles in accordance with various embodiments.

Referring now also to FIG. 2, and with continuing reference to FIG. 1, a dataflow diagram illustrates various embodiments of a fleet control system 100 for the remote control module 46. Various embodiments of the fleet control system 100 according to the present disclosure can include any number of sub-modules embedded within the remote control module 46. As can be appreciated, the sub-modules shown in FIG. 2 can be combined and/or further partitioned to similarly associate one or more operator profiles with the fleet of vehicles 12, associate a machine access code with the fleet of vehicles 12, associate a service access code with the fleet of vehicles 12 and communicate the fleet management data to each work vehicle 10*a*-*d* in the fleet of work vehicles 12. Inputs to the fleet control system 100 may be received from the terminal input device 56 (FIG. 1), received from the controllers 22*a*-*d* via the remote communication component 44 (FIG. 1), received from other control modules (not shown) associated with the work vehicles 10*a*-*d*, and/or determined/modeled by other sub-modules (not shown) within the remote control module 46. In various embodiments, the remote control module 46 includes a user or operator interface (UI) control module 102, an owner manager module 104, an owner datastore 106, an operator profile manager module 108, an operator profile datastore 110, a fleet datastore manager module 112, a fleet profile datastore 114 and a communication control module 116.

The UI control module 102 receives input data 118 from the terminal input device 56. In certain embodiments, the input data 118 includes owner identification (ID) data 120, operator profile data 122, machine access code or machine access personal identification number (PIN) data 124, machine service code or machine service personal identification number (PIN) data 126, and operator operations data 128.

The owner ID data 120 comprises an identifier of an owner of the fleet of work vehicles 12. For example, the owner ID data 120 comprises a name or operator identification associated with the owner, and a password or passcode. The UI control module 102 interprets the owner ID data 120 and sets an owner ID 121 for the owner manager module 104. The owner ID 121 comprises the operator ID of the owner and the password.

The operator profile data 122 comprises data relating to a particular operator for the fleet of vehicles 12. For example, the operator profile data 122 comprises at least one of operator ID data 130, operator permissions data 132 and operator capability data 134. The operator ID data 130 comprises a unique identifier for an operator of the fleet of work vehicles 12, such as a name, badge number, employee number, operator ID, etc. The operator permissions data 132 comprises one or more conditions associated with the operator that effect the operator's ability to operate one or more of the work vehicles in the fleet of work vehicles 12. For example, the operator permissions data 132 comprises one or more types of work vehicles and/or particular work vehicles the operator (associated with the particular operator ID data 130) is permitted to operate. The operator permissions data 132 can also include a particular work vehicle in the fleet of work vehicles 12 that the operator is permitted to operate, or one or more particular work vehicles the operator is not permitted to operate. For example, the operator may be permitted to only operate the ADT 10*c* and not the excavator 10*a*. The operator permissions data 132 can also include one or more conditions that limit the operator's ability to operate the work vehicle 10. These conditions can include a period of time for operation, a time restriction that limits the operation of the work vehicle (e.g. night time restrictions), a probation status, a total number of hours the operator is permitted to operate a work vehicle within a time period, such as 24 hours, a type of operating license held by the operator, a certification of the operator, a level of training of the operator, a number of hours of experience of the operator, and so on. For example, the operator may be permitted to operate the ADT 10*c* only after the operator has operated the loader 10*d*, or the operator may only be permitted to operate the ADT 10 for a particular period of time to prevent operator fatigue. As a further example, the operator permissions data 132 can include a work vehicle rotation, such that the operator is permitted to operate the work vehicle only if the operator has previously operated a different type of work vehicle, to ensure that the operator is becoming experienced with all of the work vehicles in the fleet of work vehicles 12.

Thus, the operator permissions data 132 comprises one or more conditions associated with the operator's ability to operate one or more work vehicles within the fleet of work vehicles 12, including, but not limited to, the types of work vehicles (i.e. excavators, loaders, graders, ADTs, tractors, etc.) the operator is permitted to operate, the particular work vehicle in the fleet of work vehicles 12 the particular operator is permitted to operate, a type of operating license held by the operator, a certification of the operator, a level of training of the operator and/or a number of hours of experience of the operator. The operator capability data 134 comprises the authority the operator (associated with the particular operator ID data 130) has to operate the various types of work vehicles. For example, the operator capability data 134 can comprise full authority or restricted authority. In the restricted authority capability, the speed of the engine 18*a-d* of the work vehicle 10*a-d* can be reduced in the case of an inexperienced operator for example.

The UI control module 102 interprets the operator profile data 122 and sets operator data 136 for the operator profile manager module 108. The operator data 136 comprises the operator permissions data 132 and the operator capability data 134 for a particular operator ID data 130.

The machine access PIN data 124 comprises an access code for entry into each of the work vehicles 10*a-d*. In certain embodiments, the machine access PIN data 124 comprises a series of inputs to the plurality of input devices associated with the keyless entry system 37*a-d* to gain access to the cab 30*a-d*. For example, the machine access PIN data 124 comprises a code of numeric characters, alpha-numeric characters, punctuation characters, symbols or combinations thereof. The UI control module 102 interprets the machine access PIN data 124, and sets fleet access PIN 138 for the fleet datastore manager module 112. The fleet access PIN 138 comprises the machine access PIN for the keyless entry systems 37*a-d* of each of the work vehicles 10*a-d* within the fleet of work vehicles 12.

The machine service PIN data 126 comprises a service access code for entry into each of the work vehicles 10*a-d* by a service technician. Generally, the machine service PIN data 126 comprises a series of inputs to the plurality of input devices associated with the keyless entry system 37*a-d* to gain access to the cab 30*a-d* for servicing the work vehicle 10*a-d*. For example, the machine service PIN data 126 comprises a code of numeric characters, alpha-numeric characters, punctuation characters, symbols or combinations thereof, which is generally distinct from the machine access PIN data 124. The UI control module 102 interprets the machine service PIN data 126, and sets fleet service PIN 140 for the fleet datastore manager module 112. The fleet service PIN 140 comprises the service access PIN for the keyless entry systems 37*a-d* of each of the work vehicles 10*a-d* within the fleet of work vehicles 12.

The operator operations data 128 comprises one or more commands received via the terminal input device 56 in response to one or more operator interfaces 142 output by the UI control module 102. In one example, the operator operations data 128 comprises erase data 144, add operator profile data 146 and exit data 148. It should be understood, however, that additional commands can be present on one or more of the operator interfaces 142. The erase data 144 and the add operator profile data 146 generally comprise a manage operator request received via the terminal input device 56.

In this example, the erase data 144 comprises a command to erase a operator profile associated with the fleet of work vehicles 12. Stated another way, the erase data 144 comprises a request to remove an operator with a stored operator profile from the plurality of operator profiles associated with the fleet of work vehicles 12. The add operator profile data 146 comprises a command to associate new operator profiles with the fleet of work vehicles 12. Stated another way, the add operator profile data 146 comprises a request to generate an operator profile for a new operator to be stored with the plurality of operator profiles associated with the fleet of work vehicles 12. The exit data 148 comprises a command to exit the one or more operator interfaces 142, and can comprise a request to log off of the remote processing system 42.

Based on the receipt of the add operator profile data 146, the UI control module 102 outputs an add user interface (UI) or add operator interface 150. The add operator interface 150 comprises one or more graphical or textual input devices, such as drop-down menus, text entry fields, etc., that enable a new operator profile to be created for a new operator of the fleet of work vehicles 12. Based on operator profile data 122 received to the add operator interface 150, the UI control module 102 sets an add operator request 152 with the operator data 136 for the operator profile manager module 108. The add operator request 152 comprises a command to add the new operator profile in the operator data 136 to the operator profiles associated with the fleet of work vehicles 12.

The UI control module 102 also receives as input fleet operator profile(s) 156 from the operator profile manager module 108. The fleet operator profile(s) 156 comprise one or more operator profiles that are associated with the fleet of work vehicles 12. The UI control module 102 populates one or more of the operator interfaces 142 based on the fleet operator profile(s) 156.

Based on the receipt of the erase data 144, the UI control module 102 outputs an erase user interface (UI) or erase operator interface 154. The erase operator interface 154 includes the operator profiles associated with the fleet of work vehicles 12, as received from the fleet operator profile(s) 156. The erase operator interface 154 comprises one or more graphical or textual input devices, such as selectors, buttons, drop-down menus, etc., that enable an operator profile to be deleted from the operator profiles associated with the fleet of work vehicles 12. Based on operator profile data 122 received to the erase operator interface 154, the UI control module 102 sets an erase operator request 157 and the operator data 136 received at the erase operator interface 154 for the operator profile manager module 108. The erase operator request 157 comprises a command to delete the operator profile based on the operator data 136 from operator profiles associated with the fleet of work vehicles 12.

Based on the receipt of the exit data 148, the UI control module 102 outputs a main operator interface 158 for display on the terminal display 58 or the UI control module 102 logs the operator off of the remote processing system 42. The main operator interface 158 comprises a main menu operator interface, from which the operator of the remote terminal system 48 can navigate to another one of the operator interfaces 142.

The UI control module 102 also outputs a machine access user interface (UI) or machine access operator interface 160 and a service personal identification number (PIN) user interface (UI) or service PIN operator interface 162. The machine access operator interface 160 comprises one or more graphical or textual input devices, such as drop-down menus, text entry fields, etc., that enable the input of the machine access PIN data 124. The service PIN operator interface 162 comprises one or more graphical or textual input devices, such as drop-down menus, text entry fields, etc., that enable the input of the machine service PIN data 126.

The UI control module 102 also receives as input verification data 164 from the owner manager module 104. The verification data 164 indicates whether the owner ID data 120 matches an owner of a particular fleet of work vehicles 12. If the owner ID data 120 matches, based on the verification data 164, the UI control module 102 outputs the main user interface (UI) or main operator interface 158 to enable the owner to modify the operator profiles, access PIN and service PIN associated with the fleet of work vehicles 12. If the verification data 164 indicates that the owner ID data 120 is unverified or does not match, the UI control module 102 outputs an error operator interface 166. The error operator interface 166 comprises a graphical and/or textual operator interface for display on the terminal display 58, which indicates that the owner ID data 120 does not match a registered owner. For example, the error operator interface 166 comprises a textual message: "Owner ID not found." It should be noted that the error operator interface 166 can comprise any suitable error message.

The owner datastore 106 stores one or more tables (e.g., lookup tables) that indicate a registered owner of a particular fleet of work vehicles 12 associated with a particular owner ID. In other words, the owner datastore 106 stores one or more tables that provide an owner 168 and an owner fleet 170 based on the owner ID 121. In one example, the owner 168 comprises the operator ID and password associated with a registered owner of a fleet of work vehicles, and the owner fleet 170 comprises the fleet of work vehicles registered to the particular owner 168. Thus, the owner datastore 106 may store one or more tables that provide the owner 168 based on the owner ID 121, and the owner fleet 170 associated with the owner ID 121. As an example, one or more tables can be indexed by various parameters such as, but not limited to, the owner ID 121, to provide the owner 168 and the owner fleet 170.

The owner manager module 104 receives as input the owner ID 121. The owner manager module 104 processes the owner ID 121, and queries the owner datastore 106. Based on the owner ID 121, the owner manager module 104 determines whether the owner ID 121 matches an owner 168 stored in the owner datastore 106. If the owner manager module 104 determines a match exists, the owner manager module 104 retrieves the owner 168 and the owner fleet 170 from the owner datastore 106 and sets the verification data 164 to indicate that the owner ID data 120 is verified. If the owner manager module 104 determines there is no match in the owner datastore 106 based on the owner ID 121, the owner manager module 104 sets the verification data 164 to unverified.

Based on the retrieval of the owner 168 and the owner fleet 170 from the owner datastore 106 upon the determination of a match, the owner manager module 104 sets fleet data 172 for the operator profile manager module 108 and the fleet datastore manager module 112. The fleet data 172 comprises the owner and work vehicles 10*a-d* in the fleet of work vehicles 12 associated with the owner, as determined by the owner manager module 104.

The operator profile datastore 110 stores one or more tables (e.g., lookup tables) that provide operator profiles for each operator associated with a particular fleet of work vehicles 12 associated with a particular owner ID. In other words, the operator profile datastore 110 stores one or more tables that provide operator profile(s) 174 based on the fleet data 172. In one example, the operator profile(s) 174 comprises the operator data 136 received from the UI control module 102 and operator preferences 176 received from the communication control module 116. Thus, the operator profile datastore 110 may store one or more tables that provide the operator profile(s) 174 based on the fleet data 172. As an example, one or more tables can be indexed by various parameters such as, but not limited to, the owner, the fleet of work vehicles, etc., to provide the operator profile(s) 174.

The operator profile manager module 108 receives as input the fleet data 172. Based on the fleet data 172, the operator profile manager module 108 queries the operator profile datastore 110 and retrieves the operator profile(s) 174 associated with the fleet of work vehicles 12. The operator profile manager module 108 sets the retrieved operator profile(s) 174 as fleet operator profile 156 for the UI control module 102 and the fleet datastore manager module 112.

The operator profile manager module 108 also receives as input the operator data 136, the add operator request 152, the erase operator request 157 and operator preferences 176. Based on the add operator request 152, the operator profile manager module 108 stores the new operator profile in the operator data 136 associated with the add operator request 152 as one of the operator profile(s) 174 associated with the fleet data 172. Based on the erase operator request 157, the operator profile manager module 108 updates the operator profile datastore 110 to remove the operator profile in the operator data 136 associated with the erase operator request 157 as one of the operator profile(s) 174 associated with the fleet data 172. Based on the receipt of the operator preferences 176, the operator profile manager module 108 associates the operator preferences 176 with a particular operator profile 174 stored in the operator profile datastore 110, and stores the operator preferences 176 with the particular operator profile 174 such that the operator preferences 176 become part of the particular operator profile 174.

The fleet profile datastore 114 stores one or more tables (e.g., lookup tables) that provide fleet profiles for fleets of work vehicles 12, with each fleet associated with a particular owner ID. In other words, the fleet profile datastore 114 stores one or more tables that provide fleet profile data 178 for a particular fleet of work vehicles 12 based on the fleet data 172. In one example, the fleet profile data 178 comprises the fleet operator profile(s) 156, the fleet access PIN 138 and the fleet service PIN 140 associated with the fleet of work vehicles 12 identified in the fleet data 172. Thus, the fleet profile datastore 114 may store one or more tables that provide the fleet profile data 178 based on the fleet data 172. As an example, one or more tables can be indexed by various parameters such as, but not limited to, the owner, the fleet of work vehicles, etc., to provide the fleet profile data 178.

The fleet datastore manager module 112 receives as input the fleet data 172, the fleet operator profile(s) 156, the fleet access PIN 138 and the fleet service PIN 140. Based on the fleet data 172, the fleet datastore manager module 112 associates each of the fleet operator profile(s) 156, the fleet access PIN 138 and the fleet service PIN 140 with the particular fleet of work vehicles 12 identified in the fleet data 172. The fleet datastore manager module 112 stores this data as fleet profile data 178 for the particular fleet of work vehicles 12 in the fleet profile datastore 114.

Based on the fleet data 172, the fleet datastore manager module 112 also sets particular fleet profile data 180 for the communication control module 116. The particular fleet profile data 180 comprises the fleet profile data 178 for the work vehicles 10a-d in the fleet of work vehicles 12 identified in the fleet data 172.

The communication control module 116 receives as input the particular fleet profile data 180. Based on the particular fleet profile data 180, the communication control module 116 processes the particular fleet profile data 180 to identify the work vehicles 10a-d in the fleet of work vehicles 12. Based on the identification, the communication control module 116 outputs fleet management data 182 to each of the identified work vehicles 10a-d via the remote communication component 44. The fleet management data 182 comprises the particular fleet profile data 180, which includes the fleet operator profile(s) 156, the fleet access PIN 138 and the fleet service PIN 140 associated with the fleet of work vehicles 12 of the particular owner.

The communication control module 116 also receives as input operator preference data 184. The operator preference data 184 comprises one or more operator preferences associated with a particular operator of one of the work vehicles 10a-d, as received from the respective vehicle communication component 40a-d associated with the work vehicle 10a-d. For example, the operator preference data 184 comprises a preference for the one or more vehicle systems 60a-d. In one example, the operator preference data 184 comprises a preference for an output of a radio of the entertainment system 62a-d, a preference for a number of travel beeps associated with a rearward movement of the work vehicle 10a-d, a preference for a position of the seat back or seat bottom and/or a preference for flow output by the pumps 24a-d. The communication control module 116 processes the operator preference data 184 and sets the operator preferences 176 for the operator profile manager module 108. The operator preferences 176 comprise preferences received in the operator preference data 184.

Figure 3A:
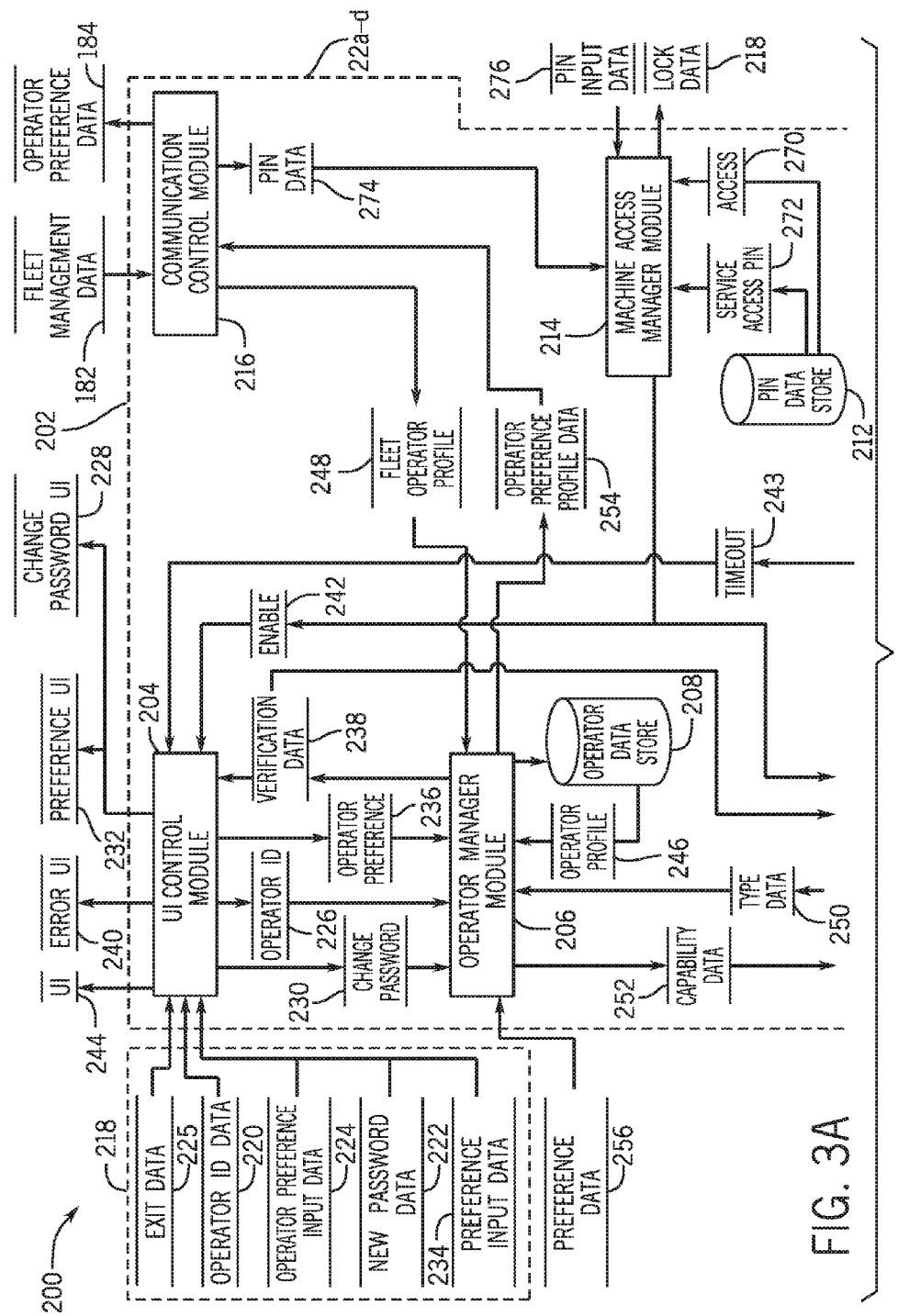
FIG. 3A is a dataflow diagram illustrating an example fleet management control system for each of the work vehicles associated with the fleet of work vehicles in accordance with various embodiments.

Referring now also to FIGS. 3A and 3B, and with continuing reference to FIGS. 1 and 2, a dataflow diagram illustrates various embodiments of a fleet management control system 200, which can be embedded in a control module 202 of each of the controllers 22a-d. Various embodiments of the fleet management control system 200 according to the present disclosure can include any number of sub-modules embedded within the control module 202. As can be appreciated, the sub-modules shown in FIGS. 3A-3B can be combined and/or further partitioned to similarly associate the fleet management data 182 with each of the work vehicles 10a-d and communicate operator preference data 184 to the remote processing system 42. Inputs to the fleet management control system 200 can be received from the input device 32a-d (FIG. 1), received from the remote control module 46 via the remote communication component 44 (FIG. 1), received from other control modules (not shown) associated with the work vehicles 10a-d, and/or determined/modeled by other sub-modules (not shown) within the controller 22a-d. In various embodiments, the control module 202 includes a user or operator interface (UI) control module 204, an operator manager module 206, an operator datastore 208, a vehicle enable control module 210, a personal identification number (PIN) datastore 212, a machine access manager module 214 and a machine communication control module 216.

The UI control module 204 receives operator input data 218 from the input device 32a-d. The input data 218 comprises operator identification (ID) data 220, new password data 222, operator preference input data 224 and exit data 225. The operator ID data 220 comprises identification data of an operator at the work vehicle 10a-d. For example, the operator ID data 220 comprises a name or operator identification associated with the operator, and a password or passcode. The UI control module 204 interprets the operator ID data 220 and sets operator data 226 for the operator manager module 206. The operator data 226 comprises the operator ID of the operator and the password.

The new password data 222 comprises a command to set a new password for a particular operator ID. Based on the receipt of the new password data 222, the UI control module 204 outputs a change password user interface (UI) or change password operator interface 228. The change password operator interface 228 comprises one or more graphical or textual input devices, such as drop-down menus, text entry fields, etc., that enable the input of a new password. Based on operator ID data 220 received to the change password operator interface 228, the UI control module 204 sets change password 230 with the operator data 226 for the operator manager module 206. The change password 230 comprises a command to associate the new password in the operator data 226 with the identifier of the operator. It should be noted that the change password operator interface 228 can also be output periodically to prompt the operator to set a new password, for example, about every three months. In addition, the period for the outputting of the change password operator interface 228 to prompt for a new password can be set via input data 118 received to the remote processing system 42, if desired.

The operator preference input data 224 comprises a command to set preferences for a particular operator ID. Based on the receipt of the operator preference input data 224, the UI control module 204 outputs a preference user interface (UI) or preference operator interface 232. The preference operator interface 232 comprises one or more graphical or textual input devices, such as drop-down menus, text entry fields, etc., that enable the input of operator preferences for the work vehicle 10a-d.

Based on preference input data 234 received to the preference operator interface 232, the UI control module 204 sets operator preferences 236 for the operator manager module 206. The operator preferences 236 comprise one or more operator preferences associated with the work vehicle 10a-d, such a preference for the one or more vehicle systems 60a-d. In one example, the operator preferences 236 comprises a preference for an output of a radio of the entertainment system 62a-d, a preference for a number of travel beeps associated with a rearward movement of the work vehicle 10a-d, a preference for a position of the seat back or seat bottom and/or a preference for flow output by the pumps 24a-d.

The UI control module 204 also receives as input verification data 238 from the operator manager module 206. The verification data 238 indicates whether the operator ID data 220 matches a permitted operator of the work vehicle 10a-d. If the operator ID data 220 is unverified or does not match a permitted operator, the UI control module 204 outputs an error user interface (UI) or error operator interface 240. The error operator interface 240 comprises a graphical and/or textual operator interface for display on the display 34a-d, which indicates that the operator ID data 220 does not match a permitted operator. For example, the error operator interface 240 comprises a textual message: "Permission to operate work vehicle not found." It should be noted that the error operator interface 240 can comprise any suitable error message.

The UI control module 204 also receives as input enable 242 from the machine access manager module 214. The enable 242 indicates that access into the cab 30a-d of the work vehicle 10a-d has been enabled. Based on the receipt of the enable 242, the UI control module 204 outputs a user interface (UI) or operator interface 244. The operator interface 244 comprises one or more graphical or textual input devices, such as drop-down menus, text entry fields, etc., that enable the input of the operator ID data 220.

The UI control module 204 receives as input a timeout 243 from the vehicle enable control module 210. The timeout 243 indicates a time associated with a shutdown command received for the engine 18a-d has exceeded a time threshold. Based on the receipt of the timeout 243, the UI control module 204 outputs the operator interface 244 to require the operator to input the operator ID data 220.

The exit data 225 comprises a command to exit the preference operator interface 232 and/or the change password operator interface 228. Based on the receipt of the exit data 225, the UI control module 204 outputs the operator interface 244 for display on the display 34a-d.

The operator datastore 208 stores one or more tables that provide operator profiles for each operator authorized to operate the work vehicles 10a-d in the fleet of work vehicles 12. In other words, the operator datastore 208 stores one or more tables that provide an operator profile 246 based on operator data 226. The operator profile 246 includes the operator ID data 130, the operator permissions data 132, the operator capability data 134 and operator preferences 176 for each of the operators associated with the work vehicles 10a-d in the fleet of work vehicles 12. In one example, the operator profile 246 comprises the fleet operator profile 248 received from the remote processing system 42 by the machine communication control module 216. Thus, the operator datastore 208 may store one or more tables that provide the operator profile 246 based on the fleet management data 182 received by the machine communication control module 216. As an example, one or more tables can be indexed by various parameters such as, but not limited to, the type of work vehicle, the operator data, etc., to provide the operator profile 246.

The operator manager module 206 receives as input the operator data 226. The operator manager module 206 processes the operator data 226, and queries the operator datastore 208. Based on the operator data 226, the operator manager module 206 determines whether the operator data 226 matches an operator profile 246 stored in the operator datastore 208. If the operator manager module 206 determines a match exists, the operator manager module 206 retrieves the operator profile 246.

The operator manager module 206 also receives as input type data 250. The type data 250 indicates the type of work vehicle 10a-d, such as loader, grader, ADT, tractor, etc., and also includes operator requirements for the particular type of work vehicle 10a-d. Thus, the type data 250 is a source of data that provides the operator requirements for the work vehicle. For example, the requirements can include, but are not limited to, a type of license, a certification, a level of training of the operator, a number of hours of experience, and so on that are required to operate the work vehicle 10a-d. The operator manager module 206 processes the retrieved operator profile 246 to determine, based on the operator profile 246, if the operator is permitted to operate the work vehicle identified in the type data 250. Stated another way, the operator manager module processes the operator profile 246 and the type data 250 to determine whether the operator has the appropriate permissions and the operator has the appropriate requirements to operate the work vehicle. If the operator manager module 206 determines the operator is not permitted to operate the work vehicle 10a-d or that there is no match in the operator datastore 208 based on the operator data 226, the operator manager module 206 sets the verification data 238 to unverified for the UI control module 204 and the vehicle enable control module 210. If the operator manager module 206 determines a match exists in the operator datastore 208 and the operator is permitted to operate the work vehicle based on the type data 250, the operator manager module 206 sets the verification data 238 to verified for the UI control module 204 and the vehicle enable control module 210.

Based on the retrieval of the operator profile 246 from the operator datastore 208 upon the determination of a match, the operator manager module 206 sets capability data 252 for the vehicle enable control module 210 based on the type data 250. The capability data 252 comprises the operator capability data 134 associated with the operator profile 246 for the type of work vehicle 10a-d determined from the type data 250.

The operator manager module 206 also receives as input the operator preference 236. Based on the operator data 226 and the operator preference 236, the operator manager module 206 updates the operator datastore 208 to associate the operator preference 236 with the operator profile 246 associated with the operator data 226. The operator manager module 206 stores the updated operator profile 246 in the operator datastore 208, and sets operator preference profile data 254, comprising the operator preferences 236 for the particular operator profile 246, for the machine communication control module 216.

Based on the retrieval of the operator profile 246 from the operator datastore 208 upon the determination of a match, the operator manager module 206 also outputs preference data 256. The preference data 256 comprises one or more control signals to the vehicle systems 60a-d and/or the pumps 24a-d based on the operator profile 246. In one example, the preference data 256 comprises one or more control signals to the entertainment system 62a-d to control an output of a radio of the entertainment system 62a-d based on the operator profile 246; one or more control signals to the warning system 64a-d, to control a number of travel beeps associated with a rearward movement of the work vehicle 10a-d, based on the operator profile 246; one or more control signals to one or more actuators associated with the seating system 66a-d to adjust a position of a seat back or seat bottom based the operator profile 246 and/or one or more control signals to the pumps 24a-d to control the flow output of the pumps 24a-d based on the operator profile 246.

The vehicle enable control module 210 receives as input a machine type 258. The machine type 258 can be received from other modules associated with the control module 202, and comprises the type of work vehicle 10a-d and the operator requirements for the work vehicle 10a-d. Based on the machine type 258, the vehicle enable control module 210 sets the type data 250 for the operator manager module 206. It should be understood that while the vehicle enable control module 210 associated with the control module 202 of the work vehicles 10a-d is discussed herein as providing the type data 250 to for the operator manager module 206, it should be understood that the type data 250, including the operator requirements for each of the work vehicles 10a-d, can be provided as input to the remote processing system 42 and communicated to the work vehicles 10a-d as fleet management data 182, if desired.

The vehicle enable control module 210 also receives as input the enable 242. Based on the receipt of the enable 242, the vehicle enable control module 210 outputs light data 260. The light data 260 comprises one or more control signals to the light source 35a-d to illuminate the cab 30a-d.

The vehicle enable control module 210 receives as input the verification data 238 and the capability data 252. The vehicle enable control module 210 processes the verification data 238 and determines if the verification data 238 indicates a verified operator. If the operator is verified, the vehicle enable control module 210 processes the capability data 252, and outputs enable data 262 based on the capability data 252. In certain embodiments, the enable data 262 comprises work tool enable data 264 for the pumps 24a-d and control valves 26a-d and engine enable data 266 for the engine control module 20a-d. The work tool enable data 264 comprises one or more control signals or control commands for the 24a-d and control valves 26a-d to enable the movement, motion or operation of the work tool 14a-d, for example, by enabling a movement of the hydraulic cylinders 16a-d. The engine enable data 266 comprises one or more control signals for the engine control module 20a-d to start-up the engine 18a-d, which enables a motion of the work vehicle 10a-d.

The vehicle enable control module 210 also receives as input a shutdown command 268. The shutdown command 268 comprises a command to shutdown the engine 18a-d, which can be received through the human-machine interface 28a-d. Based on the receipt of the shutdown command 268, the vehicle enable control module 210 starts a timer. The vehicle enable control module 210 determines whether the timer is greater than a time threshold, such as about 30 minutes. If the timer is greater than a time threshold, the vehicle enable control module 210 sets the timeout 243 for the UI control module 204.

The PIN datastore 212 stores an access personal identification number (PIN) 270 and a service access personal identification number (PIN) 272 for the work vehicle 10a-d. In one example, the PIN datastore 212 stores the fleet access PIN 138 and the fleet service PIN 140 received as personal identification number (PIN) data 274 from the machine communication control module 216.

The machine access manager module 214 receives the PIN data 274 as input from the machine communication control module 216. The PIN data 274 comprises the fleet access PIN 138 and the fleet service PIN 140 received from the remote processing system 42. The machine access manager module 214 also receives as input personal identification number (PIN) input data 276. The PIN input data 276 comprises the input received to the one or more input devices associated with the keyless entry system 37a-d. Based on the PIN input data 276, the machine access manager module 214 queries the PIN datastore 212 and determines if the PIN input data 276 matches the access PIN 270 or the service access PIN 272. If the machine access manager module 214 determines the PIN input data 276 matches the access PIN 270 or the service access PIN 272, the machine access manager module 214 sets the enable 242 for the UI control module 204 and the vehicle enable control module 210 and also outputs lock data 278. The lock data 278 comprises one or more control signals to an actuator associated with a lock of a door of the cab 30a-d to unlock the lock, based on the matching of the PIN input data 276 to the access PIN 270 or the service access PIN 272.

The machine communication control module 216 receives as input the operator preference profile data 254. Based on the operator preference profile data 254, the machine communication control module 216 outputs the operator preference data 184 for communication via the remote communication component 44 to the remote processing system 42.

The machine communication control module 216 also receives as input the fleet management data 182. The machine communication control module 216 processes the fleet management data 182 and sets the fleet operator profile 248 for the operator manager module 206 and the PIN data 274 for the machine access manager module 214.

Figure 4:
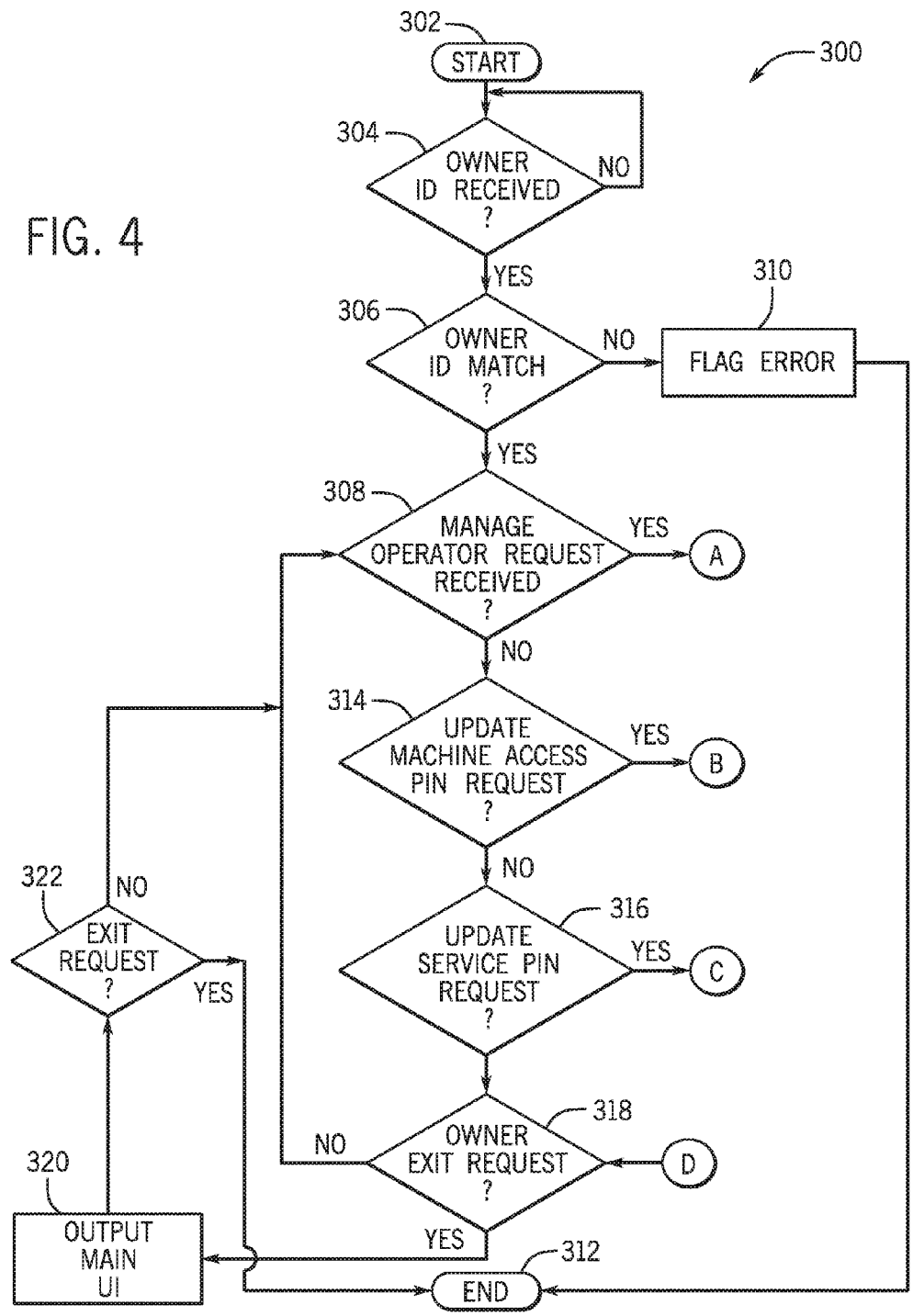
FIG. 4 is a flowchart illustrating an example control method of the disclosed fleet control system of FIG. 2 in accordance with various embodiments.

Referring now also to FIG. 4, a flowchart illustrates a control method 300 that may be performed by the remote control module 46 of FIGS. 1 and 2 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure.

In various embodiments, the method may be scheduled to run periodically, or based on predetermined events, such as based on the receipt of input data 118.

In one example, with reference to FIG. 4, the method begins at 302. At 304, the method determines whether the owner ID data 120 has been received. Based on the receipt of the owner ID data 120, the method proceeds to 306. Otherwise, the method continues to determine whether the owner ID data 120 has been received.

At 306, the method determines whether the owner ID data 120 received matches a registered owner. In one example, the method queries the owner datastore 106 to determine whether the owner ID 121 matches an owner 168 stored in the owner datastore 106. If the owner ID 121 matches an owner 168 in the owner datastore 106, the method proceeds to 308. Otherwise, at 310, the method flags an error, for example, by outputting the error operator interface 166, and ends at 312.

At 308, the method determines whether a manage operator request has been received as input, such as the add operator profile data 146 and/or the erase data 144. If a manage operator request has been received, the method proceeds to A on FIG. 5. Otherwise, at 314, the method determines whether a request to update the machine access PIN has been received via the machine access operator interface 160. If a request to update the machine access PIN has been received, the method proceeds to B on FIG. 6.

Otherwise, at 316, the method determines whether a request to update the service PIN has been received via the service PIN operator interface 162. If a request to update the service PIN has been received, the method proceeds to C on FIG. 7. Otherwise, at 318, the method determines whether the owner has requested to exit, such that exit data 148 has been received. If exit data 148 has been received, the main operator interface 158 is output for display on the terminal display 58 at 320. At 322, the method determines whether a subsequent exit request has been received at the main operator interface 158. If true, the method ends at 312. Otherwise, the method loops to 308.

Figure 5:
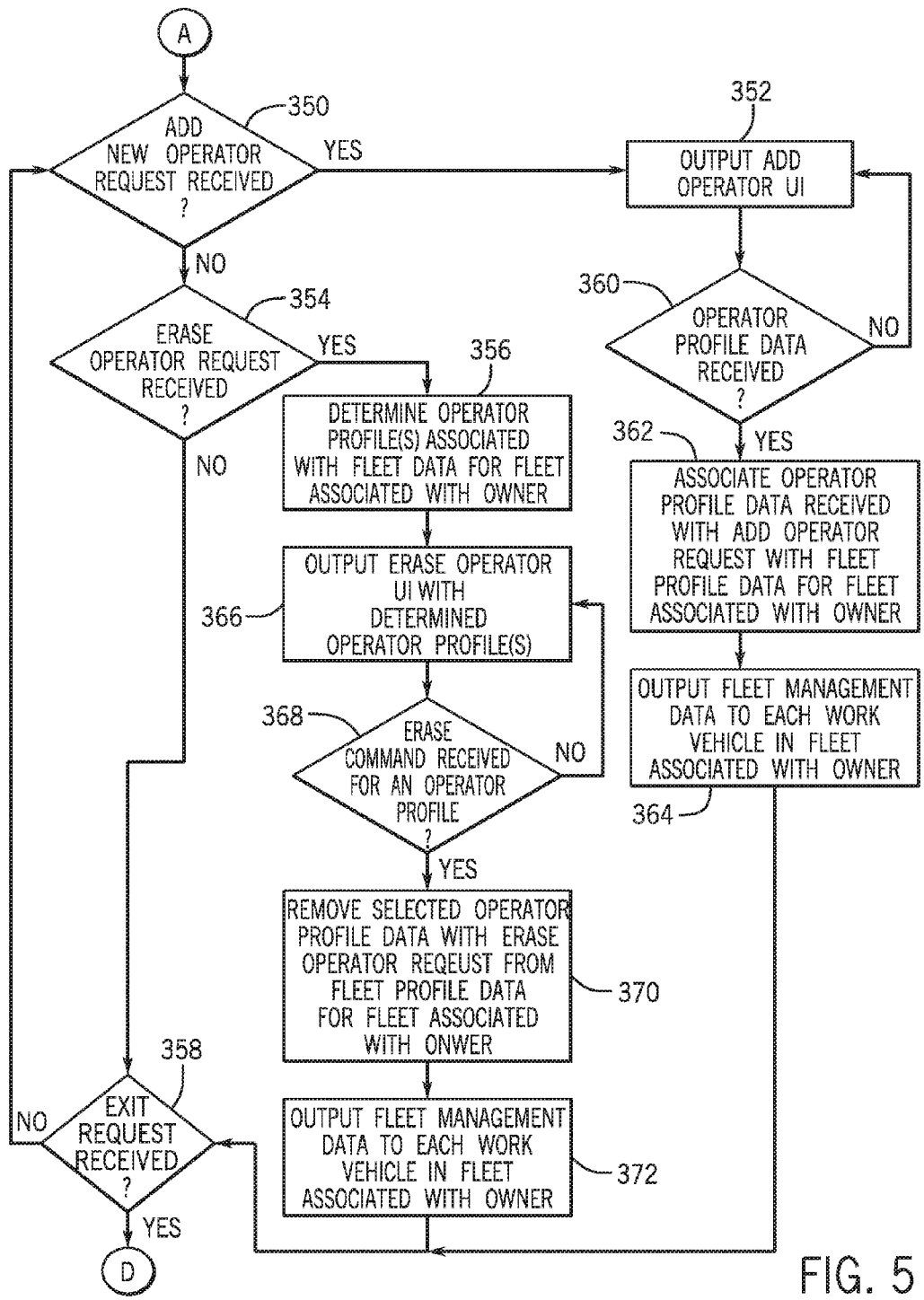
FIG. 5 is a continuation of the flowchart of FIG. 4.

From A on FIG. 5, at 350, the method determines whether add operator profile data 146 was received as input. If the add operator profile data 146 was received, the method proceeds to 352. Otherwise, at 354, the method determines whether erase data 144 was received as input. If erase data 144 was received, the method proceeds to 356. Otherwise, at 358, the method determines whether exit data 148 was received. If exit data 148 is received, the method proceeds to D on FIG. 4. Otherwise, the method loops to 350.

At 352, the method outputs the add operator interface 150. At 360, the method determines whether operator profile data 122 is received. If operator profile data 122 is received, the method proceeds to 362. Otherwise, the method loops.

At 362, the method associates the operator data 136 received via the add operator request 152 as an operator profile 174 associated with the fleet of work vehicles 12 of the particular owner. At 364, the method outputs the fleet management data 182 for the work vehicles 10a-d in the fleet of work vehicles 12, which includes the fleet operator profile 156. The method proceeds to 358.

At 356, the method determines the operator profiles 174 based on the fleet data 172, and sets fleet operator profile 156. At 366, the method outputs the erase operator interface 154, which includes the fleet operator profile 156. At 368, the method determines whether erase data 144 has been received. If erase data 144 has not been received, the method loops. Otherwise, at 370, the method removes the operator data 136 received with the erase operator request 157 from the operator profile datastore 110 for the fleet of work vehicles 12, and updates the fleet operator profile(s) 156. At 372, the method outputs the fleet management data 182 for the work vehicles 10a-d in the fleet of work vehicles 12, which includes the fleet operator profile 156. The method proceeds to 358.

Figure 6:
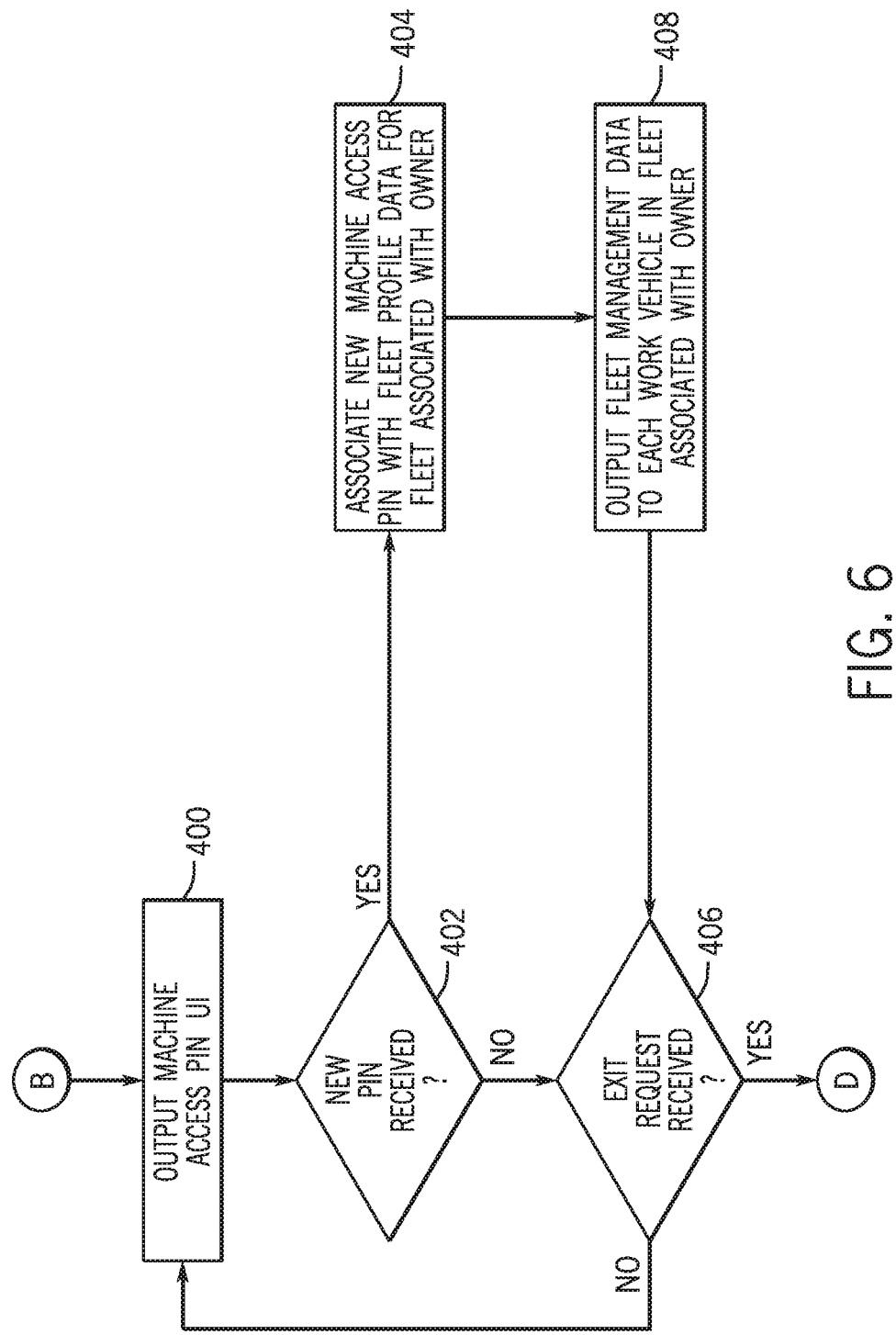
FIG. 6 is a continuation of the flowchart of FIG. 4.

From B on FIG. 6, the method outputs the machine access operator interface 160 at 400. At 402, the method determines whether a new PIN has been received, or if machine access PIN data 124 has been received. If true, the method proceeds to 404. Otherwise, at 406, the method determines whether an exit request has been received. If exit data 148 has been received, the method proceeds to D on FIG. 4. Otherwise, the method loops.

At 404, the method processes the received machine access PIN data 124 and sets the fleet access PIN 138 for the fleet datastore manager module 112. The fleet datastore manager module 112 associates the fleet access PIN 138 with the fleet data 172 to generate the fleet profile data 178 and stores the fleet profile data 178 in the fleet profile datastore 114. At 408, the method outputs the fleet management data 182 to each of the work vehicles 10a-d. The method proceeds to 406.

Figure 7:
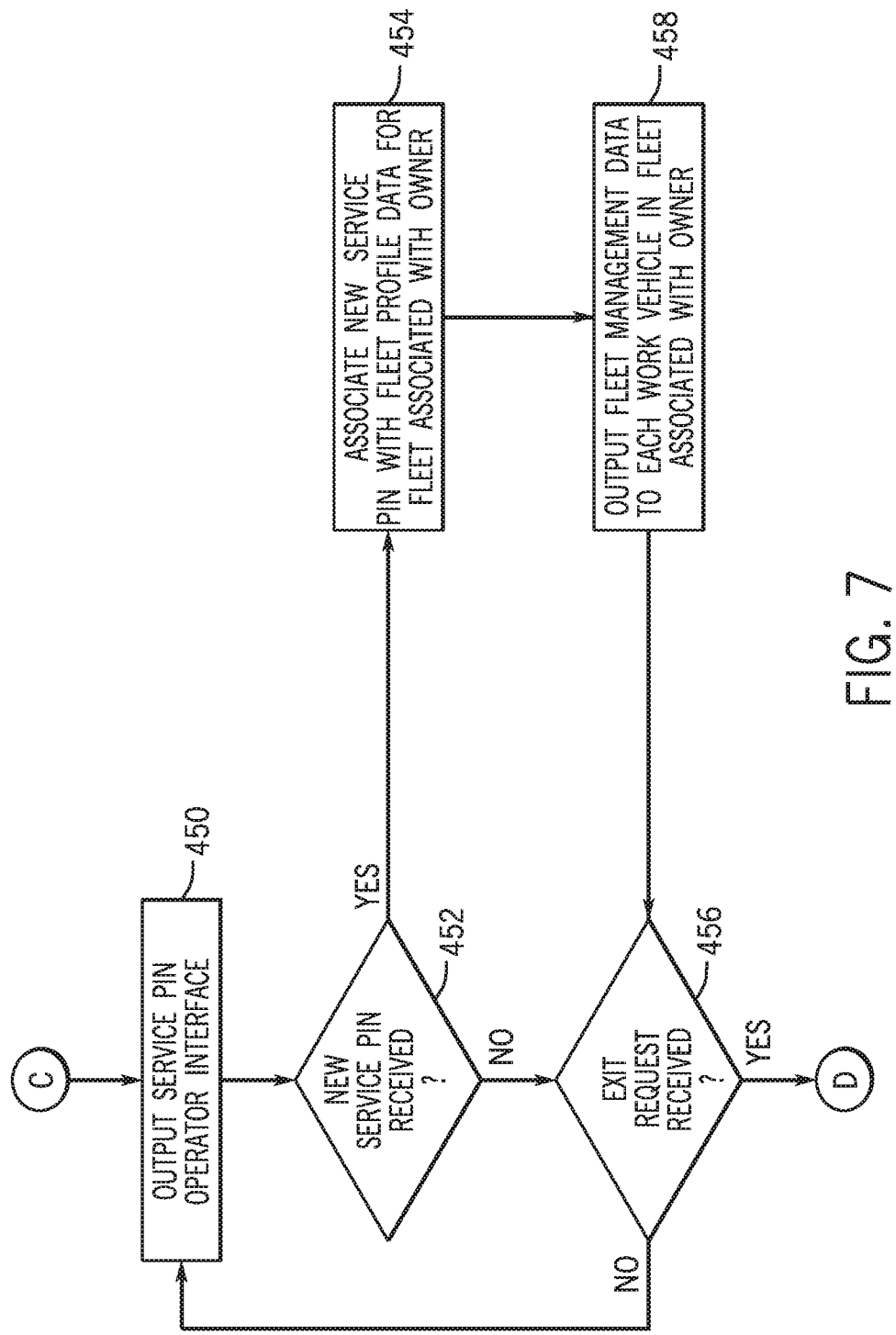
FIG. 7 is a continuation of the flowchart of FIG. 4.

From C on FIG. 7, the method outputs the service PIN operator interface 162 at 450. At 452, the method determines whether a new service PIN has been received, or if machine service PIN data 126 has been received. If true, the method proceeds to 454. Otherwise, at 456, the method determines whether an exit request has been received. If exit data 148 has been received, the method proceeds to D on FIG. 4. Otherwise, the method loops.

At 454, the method processes the received machine service PIN data 126 and sets the fleet service PIN 140 for the fleet datastore manager module 112. The fleet datastore manager module 112 associates the fleet service PIN 140 with the fleet data 172 to generate the fleet profile data 178 and stores the fleet profile data 178 in the fleet profile datastore 114. At 458, the method outputs the fleet management data 182 to each of the work vehicles 10a-d in the fleet of work vehicles 12. The method proceeds to 456.

Figure 8:
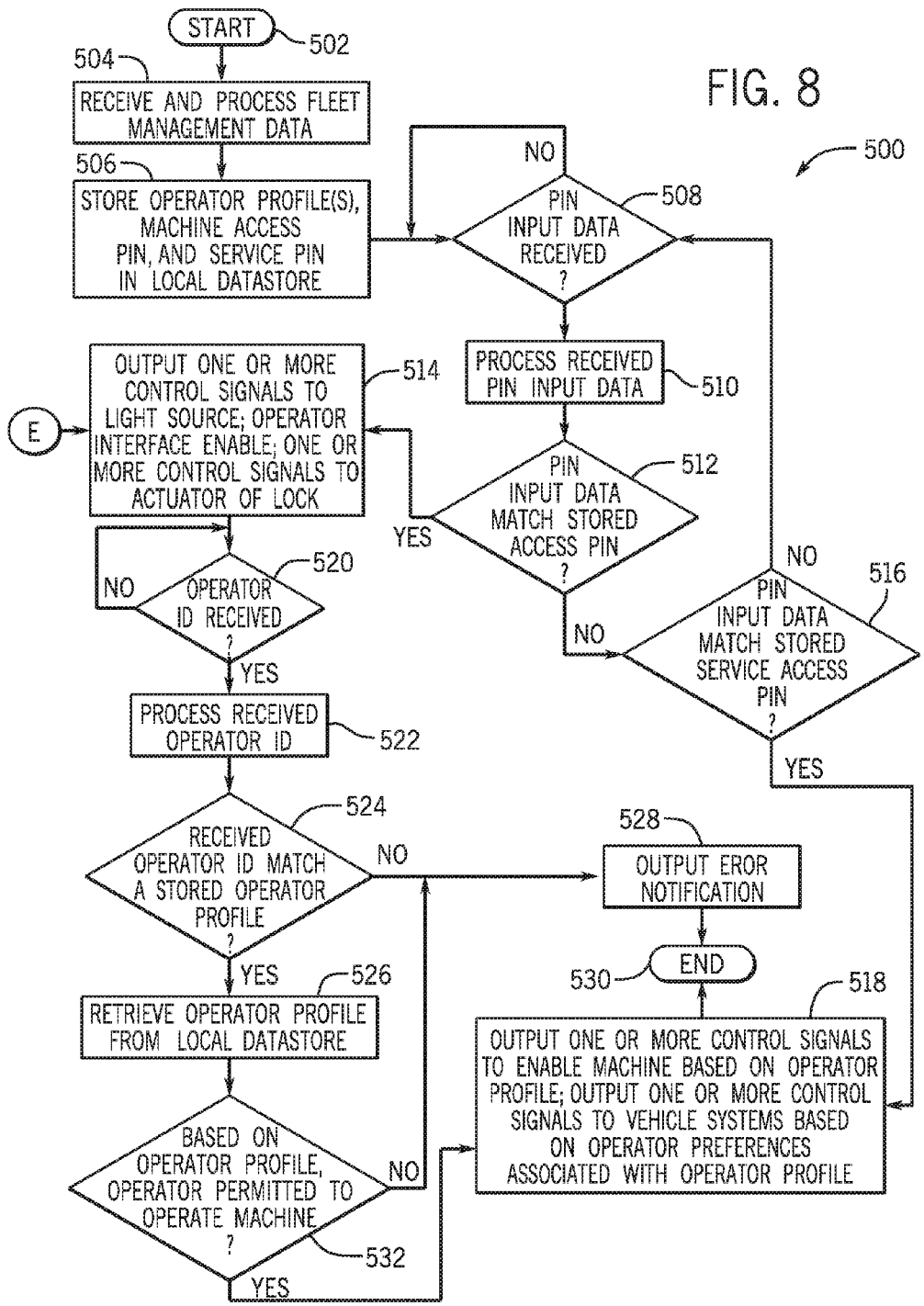
FIG. 8 is a flowchart illustrating an example control method of the disclosed fleet management control system of FIGS. 3A-3B in accordance with various embodiments.

Referring now also to FIG. 8, a flowchart illustrates a control method 500 that may be performed by the control module 202 of FIGS. 1 and 3 in accordance with the present disclosure. As can be appreciated in light of the disclosure, the order of operation within the method is not limited to the sequential execution as illustrated in FIG. 8, but may be performed in one or more varying orders as applicable and in accordance with the present disclosure.

In various embodiments, the method may be scheduled to run periodically, or based on predetermined events, such as based on the receipt of fleet management data 182.

The method begins at 502. At 504, the method receives and processes the fleet management data 182, which is received from the remote processing system 42. At 506, the method stores the fleet operator profile(s) 248 and the PIN data 274, which includes the fleet access PIN 138 and the fleet service PIN 140. At 508, the method determines whether PIN input data 276 has been received to the keyless entry system 37a-d. If PIN input data 276 has not been received, the method loops. If the PIN input data 276 has been received, the method processes the PIN input data 276 at 510, and at 512, the method determines whether the PIN input data 276 matches the access PIN 270. If the PIN input data 276 matches the access PIN 270, the method proceeds to 514. Otherwise, at 516, the method determines whether the PIN input data 276 matches the service access PIN 272. If the PIN input data 276 matches the service access PIN 272, the method proceeds to 518. Otherwise, the method loops to 508.

At 514, the method outputs the light data 260, comprising the one or more control signals for the light source 35a-d and sets the enable 242 for the UI control module 204, such that the operator interface 244 is displayed on the display 34a-d. The method also outputs one or more control signals to the actuator of the lock of door of the cab 30a-d to permit entry into the cab 30a-d. At 520, the method determines whether operator ID data 220 has been received. If operator ID data 220 has been received, the method proceeds to 522. Otherwise, the method loops.

At 522, the method processes the received operator ID data 220, and at 524, the method determines whether the received operator data 226 matches one of the operator profiles 246 stored in the operator datastore 208. If the operator data 226 matches, the method retrieves the operator profile 246 from the operator datastore 208 at 526. Otherwise, at 528, the method outputs the error operator interface 240 and ends at 530.

From 526, the method determines based on the operator profile 246 retrieved, whether the operator is permitted to operate the work vehicle 10a-d based on the operator permissions data 132 and the type data 250. If the operator is not permitted, the method proceeds to 528. If the operator is permitted, at 518, the method outputs the enable data 262 based on the capability data 252 associated with the operator profile 246, which comprises one or more control signals to the engine control module 20a-d to enable the start-up of the engine 18a-d and/or one or more control signals to the pumps 24a-d and/or control valves 26a-d to enable a movement of the work tool 14a-d. The method also outputs the preference data 256 to the one or more vehicle systems 60a-d and/or the pumps 24a-d based on the operator profile. The method ends at 530.

Figure 9:
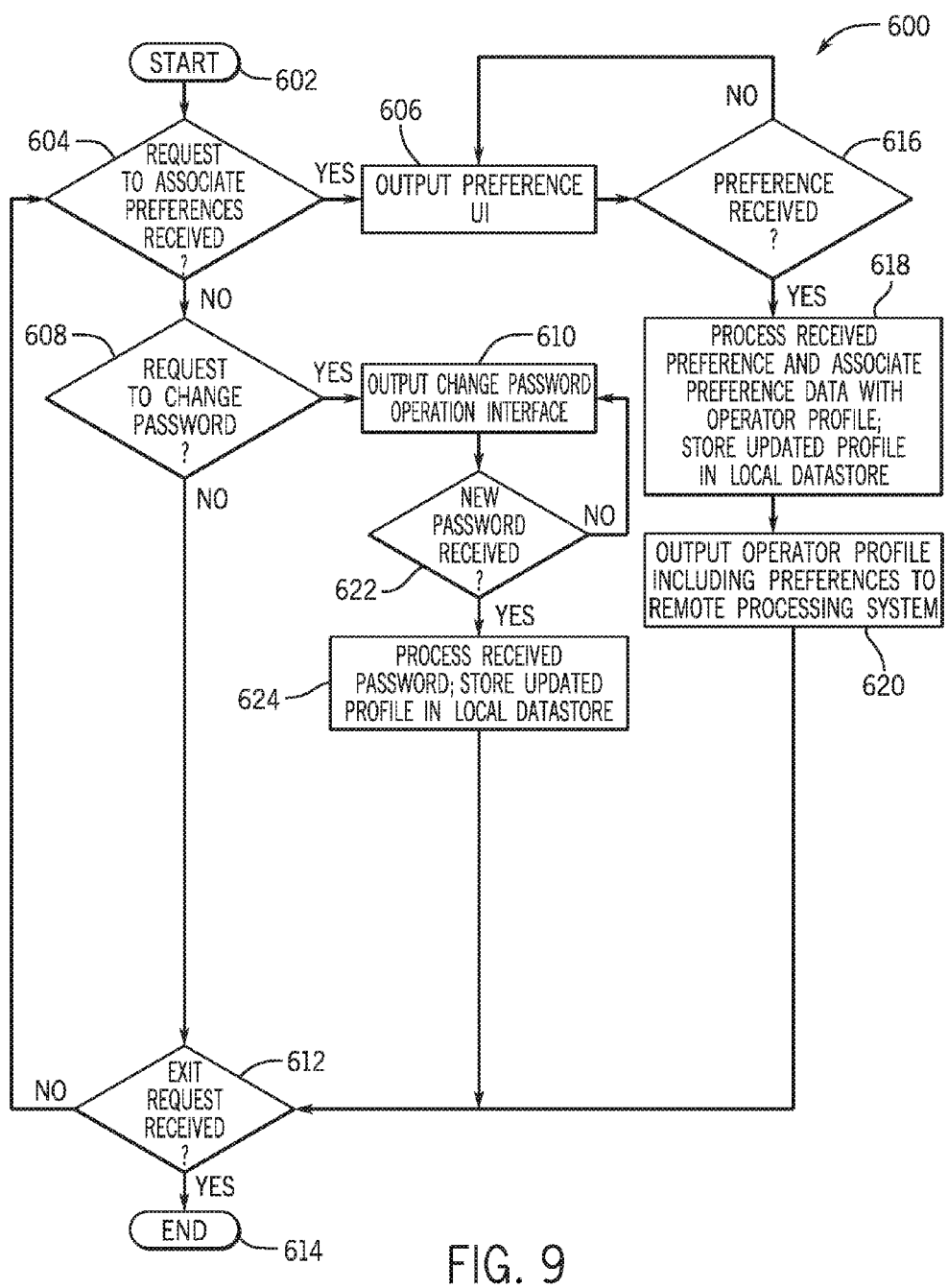
FIG. 9 is a flowchart illustrating an example control method of the disclosed fleet management control system of FIGS. 3A-3B in accordance with various embodiments.

Referring now to FIG. 9, a flowchart illustrates a control method 600 that may be performed by the control module 202 embedded in the controllers 22a-d of FIGS. 1 and 3 in accordance with the present disclosure. As can be appreciated in light of the disclosure, the order of operation within the method is not limited to the sequential execution as illustrated in FIG. 9, but may be performed in one or more varying orders as applicable and in accordance with the present disclosure.

In various embodiments, the method may be scheduled to run periodically, or based on predetermined events, such as based on the receipt of input data 218.

In one example, the method begins at 602. At 604, the method determines whether the input data 218 has been received, which comprises a request to associate operator preferences or operator preference input data 224. Based on the receipt of operator preference input data 224, the method proceeds to 606. Otherwise, the method determines whether the input data 218 comprises a request to change a password, such as new password data 222 at 608. If the input data 218 comprises new password data 222, the method proceeds to 610. Otherwise, the method determines whether exit data 225 has been received at 612. If exit data 225 has been received, the method ends at 614. Otherwise, the method loops to 604.

At 606, the method outputs the preference operator interface 232 for display on the display 34a-d. At 616, the method determines whether preference input data 234 has been received. If preference input data 234 has been received, the method proceeds to 618. Otherwise, the method loops to 606.

At 618, the method processes the received preference input data 234, associates the operator preferences 236 with the operator profile 246 of the operator, and stores the updated operator profile 246 in the operator datastore 208. At 620, the method outputs the operator preference data 184 for the remote processing system 42. The method proceeds to 612.

At 610, the method outputs the change password operator interface 228 for display on the display 34a-d. At 622, the method determines whether operator ID data 220 has been received, which includes a new password. If operator ID data 220 has been received, the method proceeds to 624. Otherwise, the method loops.

At 624, the method processes the received operator ID data 220, updates the operator profile 246 of the operator with the new password, and stores the updated operator profile 246 in the operator datastore 208. The method proceeds to 612.

Figure 10:
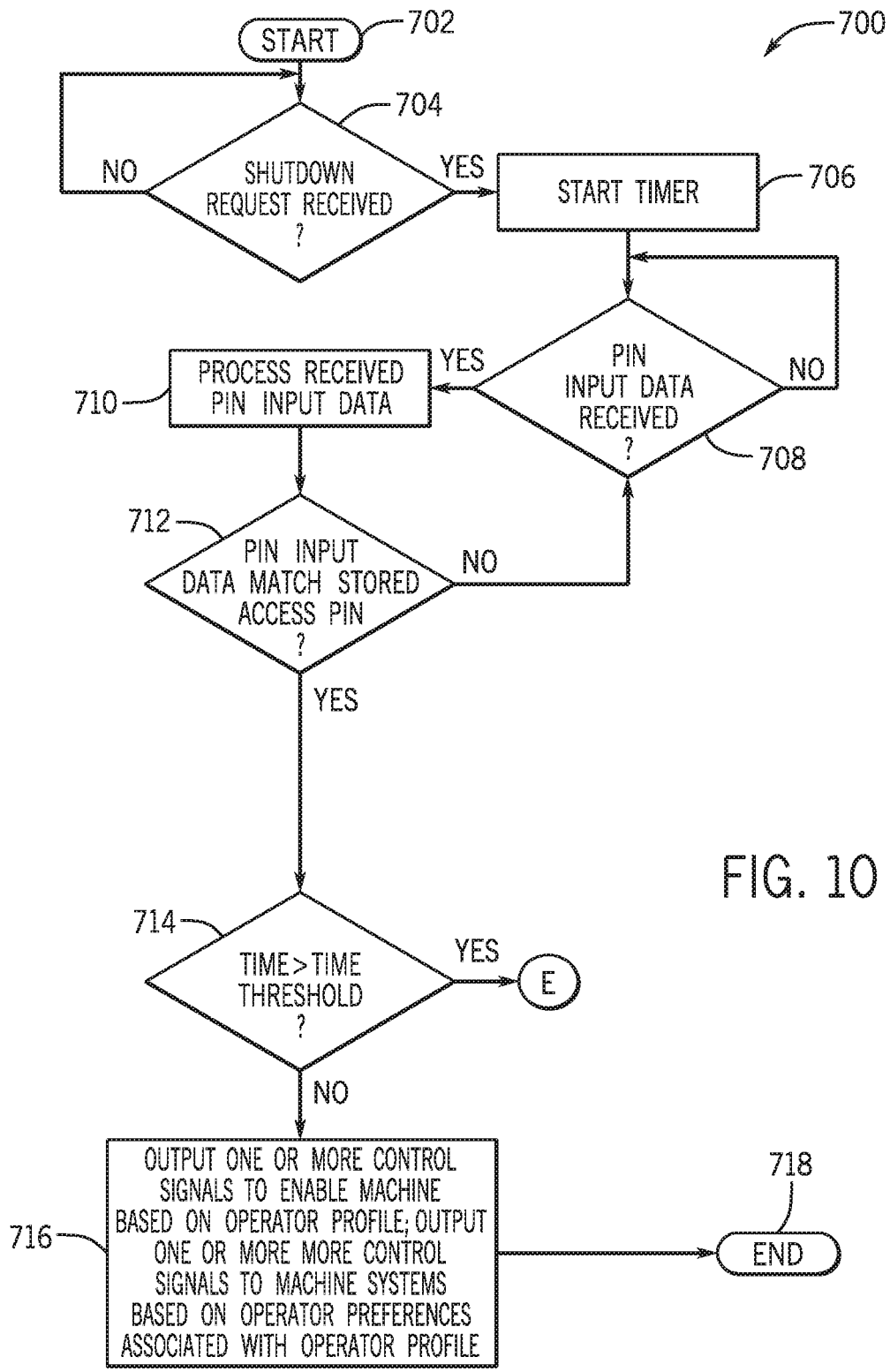
FIG. 10 is a flowchart illustrating an example control method of the disclosed fleet management control system of FIGS. 3A-3B in accordance with various embodiments.

Referring now also to FIG. 10, a flowchart illustrates a control method 700 that may be performed by the control module 202 of the controllers 22a-d of FIGS. 1 and 3 in accordance with the present disclosure. As can be appreciated in light of the disclosure, the order of operation within the method is not limited to the sequential execution as illustrated in FIG. 10, but may be performed in one or more varying orders as applicable and in accordance with the present disclosure.

In various embodiments, the method may be scheduled to run based on predetermined events, and/or can run based on the receipt of the shutdown command 268.

The method begins at 702. At 704, the method determines whether the shutdown command 268 has been received. If the shutdown command 268 has been received, the method proceeds to 706. Otherwise, the method loops.

At 706, the method starts a timer, with the time equal to zero. At 708, the method determines whether PIN input data 276 has been received. If PIN input data 276 has been received, the method proceeds to 710. Otherwise, the method loops.

At 710, the method processes the received PIN input data 276, and determines whether the received PIN input data 276 matches the access PIN 270 at 712. If the PIN input data 276 matches the access PIN 270, the method proceeds to 714. Otherwise, the method loops.

At 714, the method determines whether the time is greater than a time threshold, such as about 30 minutes. If the time is greater than the time threshold, the method proceeds to E on FIG. 8. Otherwise, at 716, the method outputs the enable data 262 based on the capability data 252 associated with the operator profile 246, which comprises one or more control signals to the engine control module 20a-d to enable the start-up of the engine 18a-d and/or one or more control signals to the pumps 24a-d and/or control valves 26a-d to enable a movement of the work tool 14a-d. The method ends at 718.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A fleet management system for a plurality of work vehicles each having a respective work tool, the work vehicles being associated with an owner and a plurality of operators, the fleet management system comprising:
   a source of input data that provides operator identification data for the work vehicles and operator permissions data that indicates at least which of the work vehicles each of the operators is permitted to operate, wherein the operator identification and permissions data comprises an operator profile, and the source of input data provides a plurality of operator profiles one for each of the operators of the work vehicles; and
   a remote processing system having a processor that receives and processes the operator identification and operator permissions data, outputs fleet management data that includes a fleet operator profile for the work vehicles based on the operator identification and operator permissions data, and communicates the fleet management data to a controller of each of the work vehicles.

2. The fleet management system of claim 1, wherein the source of input data provides an identification of the owner of the work vehicles, and the operator identification data is provided based on a verification of the owner as a registered owner.

3. The fleet management system of claim 1, further comprising a source of a plurality of operator capabilities for the operation of a respective one of the work vehicles, each of the operator capabilities being associated with a respective one of the operator profiles.

4. The fleet management system of claim 1, wherein the source of input data comprises an input device associated with a portable electronic device in communication with the remote processing system.

5. The fleet management system of claim 1, wherein the source of input data further provides a fleet personal identification number required for entry into each of the work vehicles, and the communicated fleet management data includes the fleet personal identification number.

6. The fleet management system of claim 5, wherein the fleet personal identification number provided by the source of input data provides an access personal identification number and a service personal identification number for each of the work vehicles, which is communicated to the controller of each of the work vehicles.

7. The fleet management system of claim 1, wherein the controller of each of the work vehicles receives and processes the fleet management data, and stores the fleet operator profile and the fleet personal identification number in a local datastore.

8. The fleet management system of claim 7, further comprising a source of input data at an associated one of the work vehicles that provides input personal identification number data, and the controller of the associated work vehicle queries the local datastore to determine whether the input personal identification number data matches the fleet personal identification number, and enables a display of an operator interface based on the determination.

9. The fleet management system of claim 8, further comprising:
  a source of operator requirements for each of the work vehicles;
  a source of identification data that identifies an operator at the associated work vehicle;
  wherein the controller of the associated work vehicle queries the local datastore to determine whether the identification data matches one of the operator identification data associated with the fleet operator profile and whether the operator identified in the identification data is permitted to operate the associated work vehicle based on the operator requirements for the associated work vehicle; and
  wherein the controller of the associated work vehicle outputs one or more control signals to enable a motion of the associated work vehicle based on the determination.

10. The fleet management system of claim 8, further comprising:
  a source of operator requirements for each of the work vehicles;
  a source of identification data at the associated work vehicle;
  wherein the controller of the associated work vehicle queries the local datastore to determine whether the identification data matches one of the operator identification data associated with the fleet operator profile and whether the operator identified in the identification data is permitted to operate the associated work vehicle based on the operator requirements for the associated work vehicle; and
  wherein the controller of the associated work vehicle outputs one or more control signals to a hydraulic circuit associated with the associated work vehicle to enable movement of the associated work tool.

11. A fleet management method for a plurality of work vehicles each having a respective work tool, the fleet of work vehicles being associated with an owner and a plurality of operators, the fleet management method comprising:
  receiving, from a source of input, an operator profile one for each of the plurality of operators;
  generating a fleet operator profile based on the received operator profile;
  communicating the fleet operator profile as fleet management data to each of the work vehicles;
  receiving, from a source of input data at an associated of the work vehicles, identification data that identifies an operator of the operators;
  determining, with a controller of the associated work vehicle, whether the identification data corresponds with the fleet user profile; and
  at least one of:
  outputting one or more control signals with the controller of the associated work vehicle to enable a start-up of an engine of the associated work vehicle based on the determination, and outputting one or more control signals with the controller of the associated work vehicle to enable a movement of the work tool of the associated work vehicle based on the determination.

12. The fleet management method of claim 11, wherein the received operator profile further comprises operator permissions data that indicates the plurality of work vehicles the operator is permitted to operate, and the method further comprises:
  based on the determination that the identification data matches, determining whether the operator is permitted to operate the associated work vehicle, and the outputting the one or more control signals with the controller of the associated work vehicle is based on the determination that the operator is permitted to operate the associated work vehicle.

13. The fleet management method of claim 11, further comprising:
  receiving, from the source of input, a fleet personal identification number required for entry into each of the work vehicles, the communicated fleet management data including the fleet personal identification number;
  receiving, at the controller of the associated work vehicle, a source of input personal identification number data;
  determining, with the controller of the associated work vehicle, whether the personal identification number input data matches the fleet personal identification number; and
  outputting an operator interface on a display of the associated work vehicle based on the determining, the operator interface for receiving the identification data.

14. The fleet management method of claim 13, wherein the fleet personal identification number includes an access personal identification number and a service personal identification number, and the determining by the controller of the associated work vehicle further comprises determining whether the personal identification number input data matches the access personal identification number or the service personal identification number.

15. The fleet management method of claim 13, further comprising:
  receiving at the controller of the associated work vehicle, a request to shutdown an engine of the associated work vehicle;
  determining whether a time elapsed since the shutdown request is greater than a time threshold; and
  outputting the operator interface based on the determination that the time elapsed is greater than the time threshold.

16. A fleet management system for a plurality of work vehicles each having a respective work tool, the work vehicles being associated with an owner and a plurality of operators, the fleet management system comprising:
  a source of input data remote from the work vehicles that provides an operator profile for each of the operators, the operator profile including operator identification data for the work vehicles and operator permissions data that indicates at least which of the work vehicles each of the operators is permitted to operate;

a source of operator requirements for each of the work vehicles;

a remote processing system having a processor that receives and processes the operator profile, outputs fleet management data that includes a fleet operator profile for the work vehicles based on the operator profile for the operators, and communicates the fleet management data to a controller of each of the work vehicles; and the controller of an associated one of the work vehicles processes the fleet management data, and the controller:

receives a source of identification data that identifies an operator at the associated work vehicle;

determines whether the identification data matches the operator identification data associated with the fleet user profile;

determines whether the operator is permitted to operate the associated work vehicle based on at least one of the operator permissions and the source of operator requirements for the work vehicle; and enables a motion of the associated work vehicle or the associated work tool based on the determinations.

17. The fleet management system of claim 16, wherein the source of input data further provides a fleet personal identification number required for entry into each of the work vehicles, the communicated fleet management data includes the fleet personal identification number, the controller of the associated work vehicle receives input personal identification number data at the associated work vehicle, and the controller of the associated work vehicle determines whether the input personal identification number data matches the fleet personal identification number, and enables a display of an operator interface based on the determination.

18. The fleet management system of claim 16, further comprising a source of operator preference data that indicates a preference of the operator at the associated work vehicle, the controller of the associated work vehicle receives the operator preference data and associates the operator preference data with the operator profile for the operator, and communicates the operator preference data to the remote processing system.

19. The fleet management system of claim 16, wherein the received operator profile further comprises an operator preference associated with at least one vehicle system of the work vehicles, and based on the determination that the identification data matches the operator identification data associated with the fleet operator profile, the controller of the associated work vehicle outputs one or more control signals to the at least one vehicle system based on the operator preference.

* * * * *